(12) United States Patent
Kanno

(10) Patent No.: US 11,275,539 B2
(45) Date of Patent: Mar. 15, 2022

(54) PRINTER DEVICE, CONTROL METHOD FOR A PRINTER DEVICE, INFORMATION PROCESSING APPARATUS, CONTROL METHOD FOR AN INFORMATION PROCESSING APPARATUS, AND STORAGE MEDIUM THEREFOR

(71) Applicant: CANON KABUSHIKI KAISHA, Tokyo (JP)

(72) Inventor: Shoichi Kanno, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/913,994

(22) Filed: Jun. 26, 2020

(65) Prior Publication Data

US 2021/0004186 A1 Jan. 7, 2021

(30) Foreign Application Priority Data

Jul. 2, 2019 (JP) .............................. JP2019-123647

(51) Int. Cl.
*G06F 3/12* (2006.01)

(52) U.S. Cl.
CPC .......... *G06F 3/1232* (2013.01); *G06F 3/1209* (2013.01); *G06F 3/1226* (2013.01); *G06F 3/1231* (2013.01); *G06F 3/1246* (2013.01); *G06F 3/1254* (2013.01); *G06F 3/1255* (2013.01); *G06F 3/1287* (2013.01); *G06F 3/1288* (2013.01)

(58) Field of Classification Search
None
See application file for complete search history.

(56) References Cited

U.S. PATENT DOCUMENTS

| 2016/0378411 | A1* | 12/2016 | Yokoyama | H04L 65/1073 358/1.15 |
|---|---|---|---|---|
| 2020/0301625 | A1* | 9/2020 | Kai | G06F 3/1244 |
| 2021/0117135 | A1* | 4/2021 | Suzuki | G06F 3/1204 |

FOREIGN PATENT DOCUMENTS

JP 2014-153823 A 8/2014

* cited by examiner

*Primary Examiner* — Dov Popovici
(74) *Attorney, Agent, or Firm* — Canon U.S.A., Inc. I.P. Division

(57) ABSTRACT

Provided is a technology including a printer device configuration information generation unit configured to transmit, to the terminal apparatus as an attribute value of an IPP attribute, when the IPP attribute is inquired by a terminal apparatus, information (for example, a URL) for accessing a storage area for storing IPP-undefined printer device configuration information (option XML file) regarding the printer device, to thereby allow the terminal apparatus to acquire the option XML file.

17 Claims, 14 Drawing Sheets

FIG. 11

MANUFACTURER NAME : CA○○N
MANUFACTURER ID : 0x049A
MODEL : iR1000
SERIAL NUMBER : 0010123
INFORMATION GENERATION DATE : 20190101
INFORMATION GENERATION TIME : 1340
OPTION COUNT : 1
    OPTION NAME 1 : SHIFT SORTER
    OPTION ID : OP0010
    SETTABLE ITEM COUNT 1 : 2
        SETTABLE ITEM 1 : SHIFT
        SETTABLE ITEM ID 1 : SE001
        SETTING VALUE COUNT 1 : 2
            SETTING VALUE NAME 1 : ON
            VALUE ID 1 : VA01
            VALUE 1 : 1
            SETTING VALUE NAME 2 : OFF
            VALUE ID 2 : VA02
            VALUE 2 : 2
        SETTABLE ITEM 2 : SORT
        SETTABLE ITEM ID 2 : SE002
        SETTING VALUE COUNT 2 : 2
            SETTING VALUE NAME 1 : ON
            VALUE ID 1 : VA01
            VALUE 1 : 1
            SETTING VALUE NAME 2 : OFF
            VALUE ID 2 : VA02
            VALUE 2 : 2

FIG. 14

```
MANUFACTURER NAME : CAooN
MANUFACTURER ID : 0x049A
MODEL : iR1000
SERIAL NUMBER : 0010123
INFORMATION GENERATION DATE : 20190101
INFORMATION GENERATION TIME : 1340
SUPPORTED OS COUNT : 3
        OS NAME 1 : Winodws
        OS ID 1 : OS01
        OPTION COUNT : 1 : 1
                OPTION NAME 1 : SHIFT SORTER
                OPTION ID 1 : OP0010
                SETTABLE ITEM COUNT 1 : 2
                        SETTABLE ITEM 1 : SHIFT
                        SETTABLE ITEM ID 1 : SE001
                        SETTING VALUE COUNT 1 : 2
                                SETTING VALUE NAME 1 : ON
                                VALUE ID 1 : VA01
                                VALUE 1 : 1
                                SETTING VALUE NAME 2 : OFF
                                VALUE ID 2 : VA02
                                VALUE 2 : 2
                        SETTABLE ITEM 2 : SORT
                        SETTABLE ITEM ID 2 : SE002
                        SETTING VALUE COUNT 2 : 2
                                SETTING VALUE NAME 1 : ON
                                VALUE ID 1 : VA01
                                VALUE 1 : 1
                                SETTING VALUE NAME 2 : OFF
                                VALUE ID 2 : VA02
                                VALUE 2 : 2
        OS NAME 2 : Macintosh
        OS ID 2 : OS02
        OPTION COUNT : 2 : 0
        OS NAME 3 : Linunx
        OS ID 3 : OS03
        OPTION COUNT : 3 : 1
                OPTION NAME 1 : SHIFT SORTER
                OPTION ID 1 : OP0010
                SETTABLE ITEM COUNT 1 : 2
                        SETTABLE ITEM 1 : SHIFT
                        SETTABLE ITEM ID 1 : SE001
                        SETTING VALUE COUNT 1 : 2
                                SETTING VALUE NAME 1 : ON
                                VALUE ID 1 : VA01
                                VALUE 1 : 1
                                SETTING VALUE NAME 2 : OFF
                                VALUE ID 2 : VA02
                                VALUE 2 : 2
                        SETTABLE ITEM 2 : SORT
                        SETTABLE ITEM ID 2 : SE002
                        SETTING VALUE COUNT 2 : 2
                                SETTING VALUE NAME 1 : ON
                                VALUE ID 1 : VA01
                                VALUE 1 : 1
                                SETTING VALUE NAME 2 : OFF
                                VALUE ID 2 : VA02
                                VALUE 2 : 2
```

PRINTER DEVICE, CONTROL METHOD FOR A PRINTER DEVICE, INFORMATION PROCESSING APPARATUS, CONTROL METHOD FOR AN INFORMATION PROCESSING APPARATUS, AND STORAGE MEDIUM THEREFOR

BACKGROUND OF THE INVENTION

Field of the Invention

The present disclosure relates to a printer device, a control method for a printer device, an information processing apparatus, a control method for an information processing apparatus, and a storage medium therefor.

Description of the Related Art

In order to use a printer device or another such peripheral device from an information processing apparatus to which the peripheral device is connected, it is common to install a specific device driver corresponding to the peripheral device on an operating system (hereinafter referred to as "OS") operating on the information processing apparatus. That is, in the case of a printer device, a printer driver is installed on the information processing apparatus to use the printer device. The printer driver is configured in accordance with specifications defined for the OS. A vendor that provides a printer device enables the information processing apparatus to perform printing through use of the printer device by providing a printer driver corresponding to each printer (each model) to a user. In Japanese Patent Application Laid-Open No. 2014-153823, there is proposed a method involving acquiring a user interface extension file for such a printer driver corresponding to each printer under an environment in which network access is restricted.

In addition, in recent years, there has been provided a general-purpose printer driver capable of issuing print instructions to printer devices made by various vendors. In general, such a general-purpose printer driver only supports a general-purpose function (for example, duplex printing) and does not support a function, for example, of controlling a vendor-specific optional apparatus connected to a vendor-specific printer device.

However, there is a demand to make the most of the capabilities of a printer device and an optional apparatus even in the above-mentioned case of performing printing through use of a general-purpose printer driver that does not support a function of controlling a vendor-specific optional apparatus.

SUMMARY OF THE INVENTION

In view of the demand to make the most of the capabilities of printer devices and optional apparatuses, it is desirable for an information processing apparatus configured to perform printing through use of a general-purpose printer driver to be informed of capability information regarding a printer device, where such capability information includes information regarding a capability of, for example, an optional apparatus.

According to one embodiment of the present disclosure, there is provided a printer device configured to perform printing by receiving, from an information processing apparatus, a print job transmitted through use of a predetermined protocol. The printer device includes a transmission unit configured to transmit, to the information processing apparatus, when capability information regarding the printer device is inquired by the information processing apparatus, information for accessing a storage area for storing capability information regarding the printer device, to allow the information processing apparatus to thereby acquire the capability information.

Further features will become apparent from the following description of exemplary embodiments with reference to the attached drawings.

BRIEF DESCRIPTION OF THE DRAWINGS

FIG. 11 is a diagram for illustrating an example of XML (option XML) data generated as IPP-undefined printer device configuration information according to the first embodiment.

FIG. 14 is a diagram for illustrating an example of XML (option XML) data generated as IPP-undefined printer device configuration information according to the second embodiment.

DESCRIPTION OF THE EMBODIMENTS

Now, embodiments of the present disclosure are described with reference to the drawings. Note that, the following embodiments are not intended to limit the scope defined in the appended claims, and not all combinations of features described in the embodiments are essential to solutions of the present disclosure.

First Embodiment

First, a configuration of a printing system in a first embodiment of the present disclosure is described with reference to FIG. 1.

Figure 1:
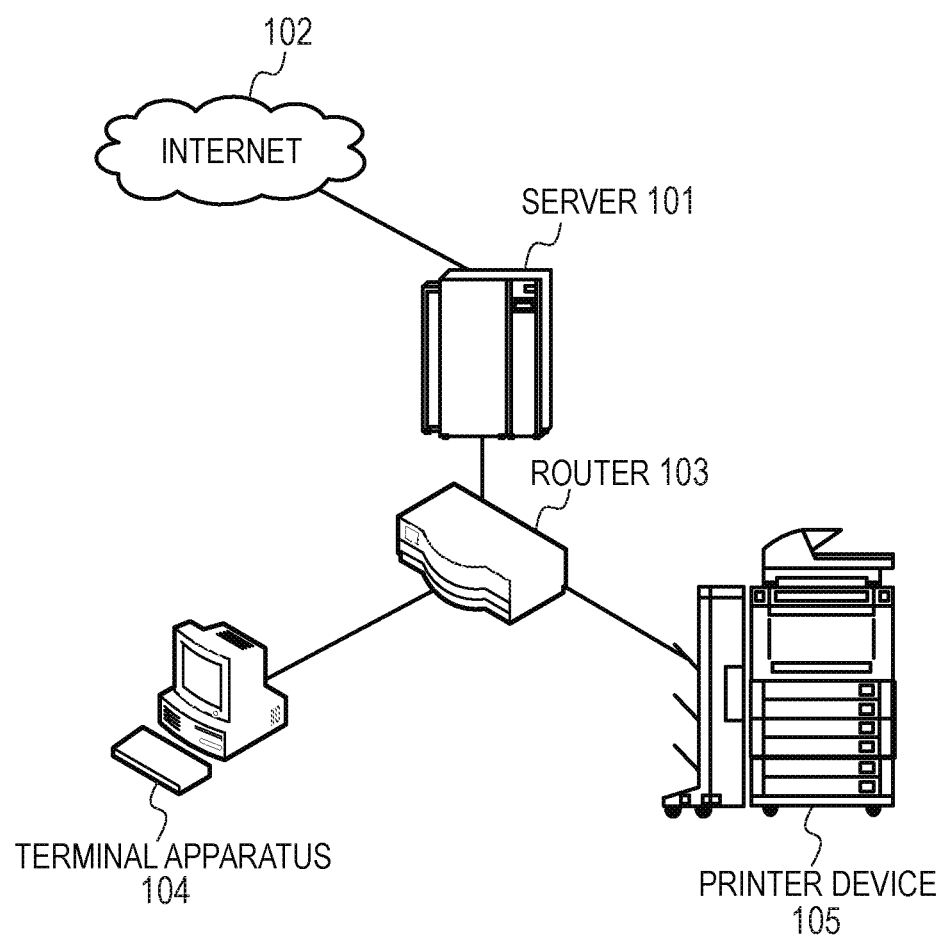
FIG. 1 is a diagram for illustrating an example of a configuration of a printing system according to a first embodiment of the present disclosure.

FIG. 1 is a diagram for illustrating an example of the configuration of the printing system in the first embodiment.

A server 101 is a server system for controlling a network environment in a corporation. In the first embodiment, it is assumed that the server 101 also has a function of exchanging information between the Internet 102 and a network in the corporation.

A terminal apparatus 104 participating in the network environment in the corporation is an information processing apparatus capable of accessing resources on the Internet 102 via the server 101. On the Internet 102, there are, for example, an application distribution server (not shown) of an OS vendor and an application distribution website (not shown) of a printer device vendor. The terminal apparatus 104 can generate a print job based on data to be printed, and can transmit the print job to a printer device (for example, printer device 105) on the network. The terminal apparatus 104 uses a predetermined protocol (in the first embodiment, Internet Printing Protocol (IPP protocol)) to control the printer device 105 to perform printing.

The printer device 105 has a function of receiving the print job transmitted from the terminal apparatus 104 or another such client computer and printing an image on a sheet based on the received print job.

<Terminal Apparatus 104>

Figure 2:
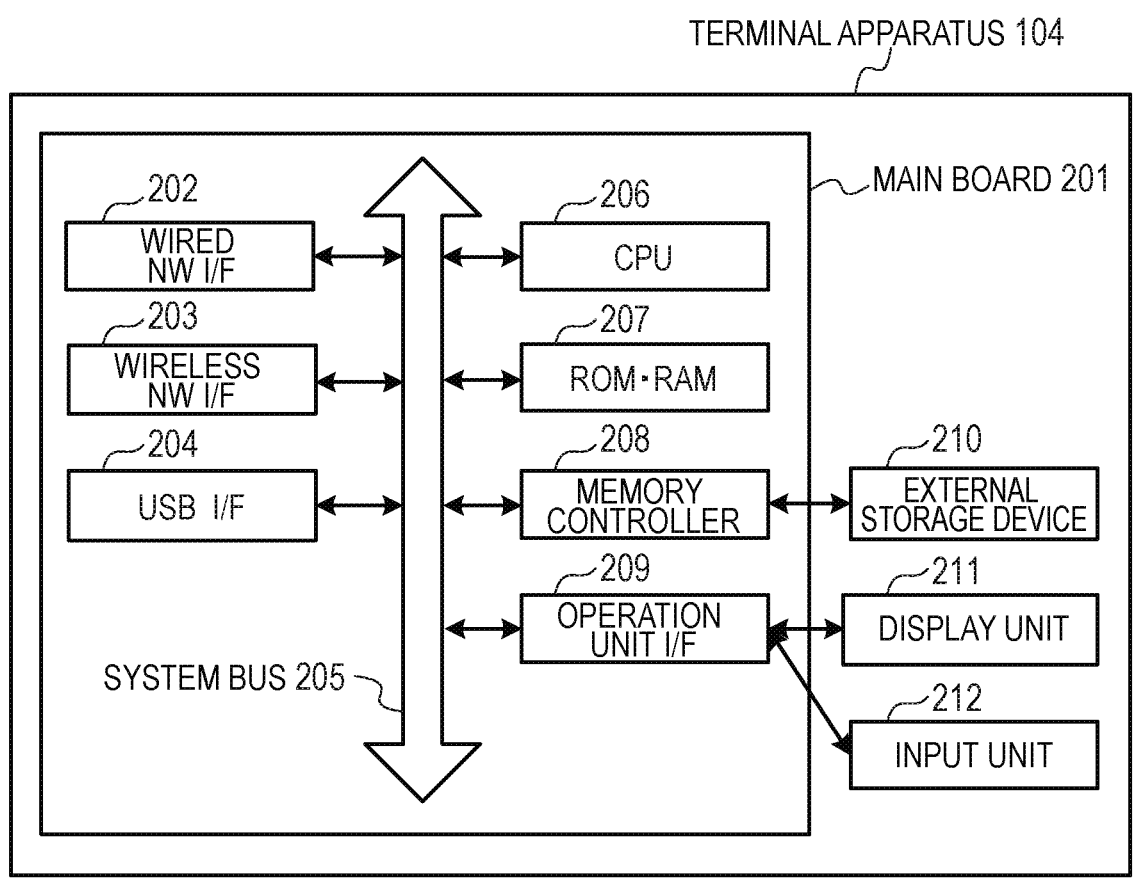
FIG. 2 is a diagram for illustrating an example of a hardware configuration of a terminal apparatus according to the first embodiment.

FIG. 2 is a diagram for illustrating an example of a hardware configuration of the terminal apparatus 104.

The terminal apparatus 104 is a general information processing apparatus, and may be a mobile terminal represented by a smartphone or a tablet computer, or may be a computer terminal represented by a personal computer.

A main board 201 is a control board of the terminal apparatus 104.

A wired NW I/F 202 is configured to control communication through a communication network represented by Ethernet (trademark). The terminal apparatus 104 can communicate to/from an apparatus on a network in the corporation or on the Internet 102 via the wired NW I/F 202.

A wireless NW I/F 203 mainly controls wireless communication conforming to the IEEE 802.11 series (also referred to as "Wi-Fi (trademark) communication"). The wireless NW I/F 203 also functions as an interface for LTE, 5G, or another such mobile communication system. The terminal apparatus 104 can communicate to/from an apparatus on the network in the corporation or on the Internet 102 via the wireless NW I/F 203. The terminal apparatus 104 can also use the wireless NW I/F 203 to directly access the Internet 102 via a base station of the mobile communication system.

A USB I/F 204 is used for connection to a peripheral device conforming to the USB standard, for example.

A system bus 205 is used to exchange information mutually between various processing blocks on the main board 201. A CPU 206 is configured to execute an operating system (OS), an application, and other such control programs, which are loaded onto a ROM/RAM 207, to control an operation of the entire terminal apparatus 104. The ROM/RAM 207 collectively represents a storage area for storage of a program for starting up the terminal apparatus 104 and a storage area serving as a work area.

A memory controller 208 is configured to control transmission/reception of data to/from an external storage device 210. The external storage device 210 is a storage area having an auxiliary function of the ROM/RAM 207 of the terminal apparatus 104, and generally corresponds to, for example, a hard disk drive, a solid-state drive, a USB memory, or an optical memory device. The external storage device 210 stores an OS, an application, and other such programs, and stores, for example, temporary data and files.

In this manner, the hardware including the CPU 206, the ROM/RAM 207, and the external storage device 210 forms a so-called computer.

In the first embodiment, it is assumed that one CPU 206 executes each of processing steps illustrated in a flow chart described later, but another mode may be employed. For example, a plurality of processors may also be configured to execute each of the processing steps illustrated in the flow chart described later in cooperation with, for example, a memory and a storage.

An operation unit I/F 209 is used to connect the main board 201 to a display unit 211 and an input unit 212. The display unit 211 is a display device, for example, a liquid crystal panel or an organic EL panel, and functions as a display unit configured to present information to a user.

The input unit 212 is a device, for example, a keyboard, a mouse, or a touch panel provided to the surface of the display unit, and functions as a reception unit configured to receive an operation from the user.

<Printer Device 105>

Figure 3:
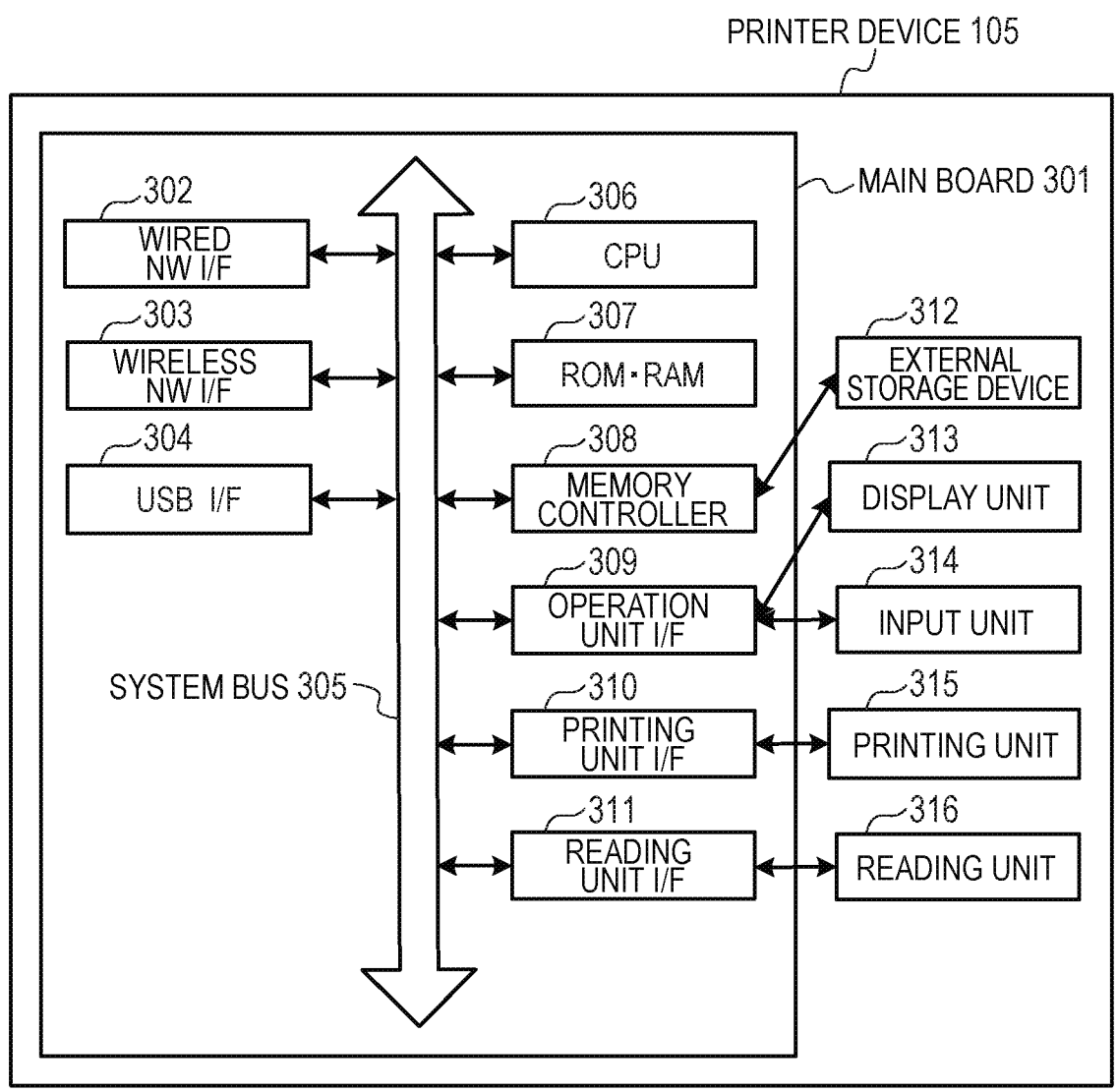
FIG. 3 is a diagram for illustrating an example of a hardware configuration of a printer device according to the first embodiment.

FIG. 3 is a diagram for illustrating an example of a hardware configuration of the printer device 105.

The printer device 105 has a function of receiving print data from the outside and performing printing. In the first embodiment, the case of employing a single-function peripheral (SFP) as an example of the printer device is exemplified, but the present disclosure is not limited thereto. It is instead possible to employ a multi-function peripheral (MFP) obtained by integrating a plurality of functions of, for example, copying, printing, FAX, and image reading in a single casing.

A main board 301 is a control board of the printer device 105.

A wired NW I/F 302 is configured to control communication through a wired communication network represented by Ethernet. The printer device 105 can communicate to/from an apparatus on the network in the corporation or on the Internet 102 through use of the wired NW I/F 302.

A wireless NW I/F 303 mainly controls wireless communication conforming to the IEEE 802.11 series (also referred to as "Wi-Fi (trademark) communication"). The wireless NW I/F 303 also functions as an interface for LTE, 5G, or another such mobile communication system. The printer device 105 can communicate to/from an apparatus on the network in the corporation or on the Internet 102 via the wireless NW I/F 303. The printer device 105 can also use the wireless NW I/F 303 to directly access the Internet 102 via a base station of the mobile communication system. A display unit 313 and an input unit 314, which are provided to the printer device 105, can be used to set and change whether to access the Internet 102 in a wired manner or a wireless manner.

An USB I/F 304 is used for connection to a terminal device conforming to the USB standard, for example.

A system bus 305 is used to exchange information mutually between various processing blocks on the main board 301.

A CPU 306 is configured to execute an OS, an application, and other such control programs, which are loaded onto a ROM/RAM 307, to control an operation of the entire printer device 105. The ROM/RAM 307 collectively represents a storage area for storage of a program for starting up the printer device 105 and a storage area serving as a work area.

A memory controller 308 is configured to control transmission/reception of data to/from an external storage device 312. The external storage device 312 is a storage area having an auxiliary function of the ROM/RAM 307 of the printer device 105, and generally corresponds to, for example, a hard disk drive, a solid-state drive, a USB memory, or an optical memory device. The external storage device 312 stores an OS, an application, and other such programs, and stores, for example, temporary data and files.

An operation unit I/F 309 is used to connect the main board 301 to a display unit 313 and an input unit 314. The display unit 313 is a display device, for example, a liquid crystal panel or an organic EL panel, and functions as a display unit configured to present information to a user. The input unit 314 is a device, for example, a keyboard or a touch panel provided to the surface of the display unit, and functions as a reception unit configured to receive an operation from the user.

A printing unit I/F 310 is configured to pass image data for printing to a printing unit 315. The printing unit 315 is a so-called printer engine, and refers to a printer device using any one of various printing methods including an electrophotographic printing method and an ink-jet printing method. The printing unit 315 also includes sheet feeding cassettes configured to hold a plurality of types of paper, a duplex printing mechanism, a monochrome/color printing mechanism, a stapling mechanism, a bookbinding mechanism, a trimming mechanism, and a shift sorter. Now, the stapling mechanism and the shift sorter are described in more detail. With the stapling mechanism, it is possible to perform binding processing of, for example, binding a plurality of sheets. With the shift sorter, it is possible to easily handle printing results in units of copies by, for example, aligning sheets to the left and right alternately in units of copies on an outlet for printing sheets so as to facilitate the grasping of breaks between copies or outputting sheets onto a plurality of outlets in units of copies.

A reading unit I/F 311 is configured to receive the image data from a reading unit 316. The reading unit 316 is a so-called scanner, and includes an original table and an image sensor. The reading unit 316 also includes, for example, a feeder configured to automatically feed sheets to be read.

Figure 4A:
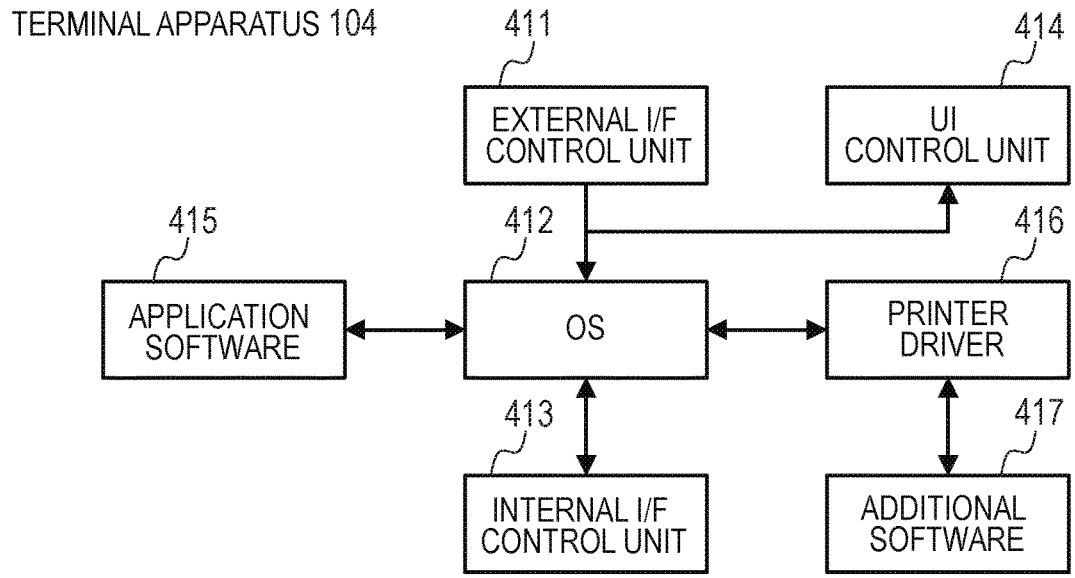
FIG. 4A is a diagram for illustrating an example of a software configuration of the terminal apparatus according to one embodiment of the present disclosure.
Figure 4B:
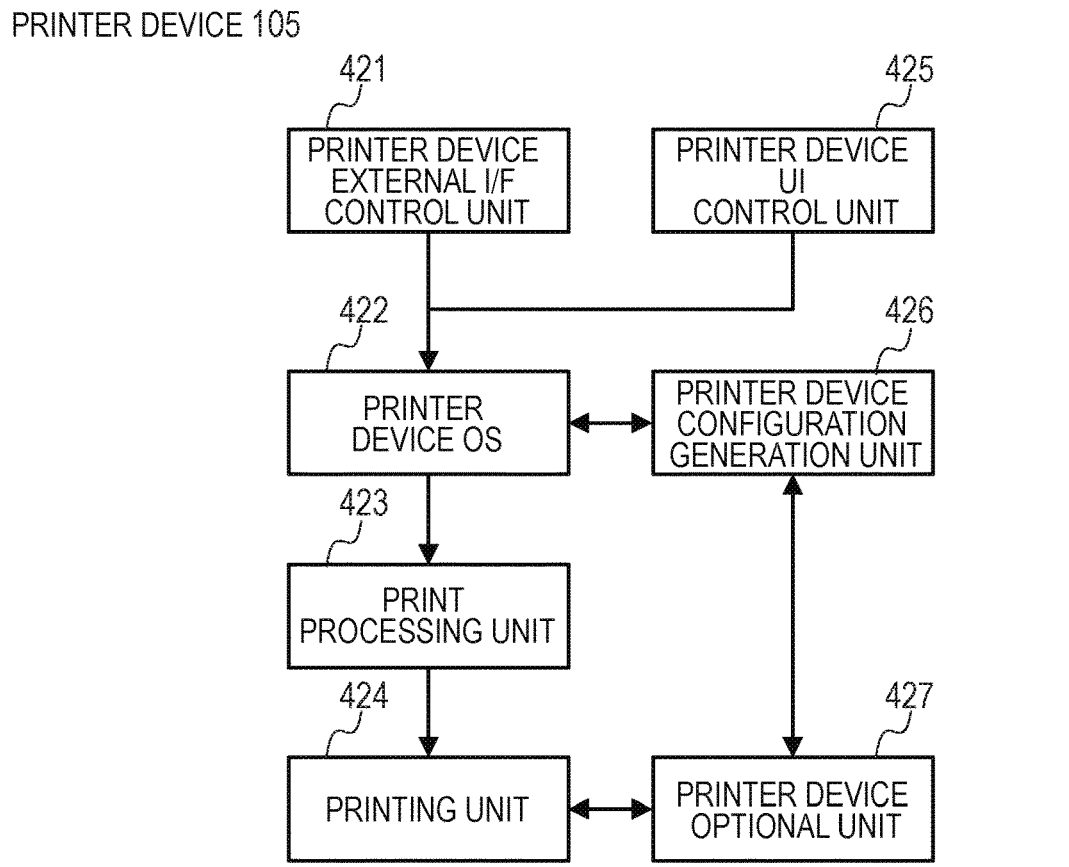
FIG. 4B is a diagram for illustrating an example of a software configuration of the printer device according to one embodiment of the present disclosure.

FIG. 4A and FIG. 4B are diagrams for illustrating examples of software configurations of the terminal apparatus 104 and the printer device 105.

First, the software configuration of the terminal apparatus 104 is described.

FIG. 4A corresponds to the software configuration of the terminal apparatus 104. The configuration illustrated in FIG. 4A functions when the CPU 206 of the terminal apparatus 104 mainly executes a program stored on the ROM/RAM 207.

An external I/F control unit 411 is configured to communicate to/from the server 101 through use of the wired NW I/F 202 or the wireless NW I/F 203, and is used for access to, for example, a website of the printer device vendor and a website of the OS vendor, which are provided on the Internet 102. The external I/F control unit 411 is also configured to transmit a job for printing to be output to the printer device 105, and acquire configuration information on the printer device from the printer device 105.

A UI control unit 414 is a component configured to provide information to the user of the terminal apparatus 104 through use of the display unit 211 and the input unit 212, and to receive an instruction from the user of the terminal apparatus 104.

An OS 412 refers to an operating system stored on the ROM/RAM 207 and configured to control the entire operation of the terminal apparatus 104. The OS 412 is a component configured to perform information exchange and execution control among software blocks on the terminal apparatus 104.

An internal I/F control unit 413 is a component configured to store, for example, software including an OS, a printer driver, additional software, and various kinds of application software, which are stored in the external storage device 210 of the terminal apparatus 104.

An application software 415 refers to word processor software, spreadsheet software, or other such software stored on the ROM/RAM 207 so as to operate. When the OS 412 is instructed to print data created by the application software 415, the print data is output to the printer device 105 through use of a printer driver 416.

The printer driver 416 is stored on the ROM/RAM 207 so as to operate. When receiving the instruction from the OS 412, the printer driver 416 converts the data output by the application software 415 into data having a format that can be interpreted by the printer device 105. The printer driver 416 acquires printer device configuration information from the printer device 105, interprets information on an available option, and also displays the interpreted information on the UI control unit 414 as a print setting. The printer driver 416 is a general-purpose printer driver capable of issuing a print instruction to printer device of various vendors. For example, the printer driver 416 may be a printer driver conforming to the Mopria standard defined by the Mopria (trademark) Alliance.

An additional software 417 is stored on the ROM/RAM 207 so as to operate. The additional software 417 cooperates with the printer driver 416 to interpret printer device configuration information provided by the printer device 105 and display the interpreted printer device configuration information on the UI control unit 414 as a print setting. In addition, the additional software 417 performs processing for fetching a job for printing created by the printer driver 416 and adding print setting information for a vendor-specific IPP-undefined printer device to the job for printing.

Next, the software configuration of the printer device 105 is described.

FIG. 4B corresponds to the software configuration of the printer device 105. The configuration illustrated in FIG. 4B functions when the CPU 306 of the printer device 105 mainly executes a program stored on the ROM/RAM 307.

A printer device external I/F control unit 421 is configured to receive job data for printing transmitted from the terminal apparatus 104 through use of the wired NW I/F 302 or the wireless NW I/F 303. The printer device external I/F control unit 421 is also configured to provide the printer device configuration information to the terminal apparatus 104 based on a request received from the terminal apparatus 104.

A printer device OS 422 refers to an operating system stored on the ROM/RAM 307 and configured to control the entire operation of the printer device 105. The printer device OS 422 is a component configured to perform information exchange and execution control among software blocks on the printer device 105.

A printer device optional unit 427 is an optional component for printing, for example, a duplex printing mechanism, a monochrome/color printing mechanism, a stapling mechanism, a bookbinding mechanism, a trimming mechanism, and a shift sorter. The printer device optional unit 427 is configured to obtain control information from a printing unit 424 to operate based on the obtained control information.

A print processing unit 423 is configured to convert the job data for printing, which has been received via the wired NW I/F 302, the wireless NW I/F 303, or the USB I/F 304, into a format that can be interpreted by the printing unit 424. The printing unit 424 is a component configured to print data for printing, which has been provided from the print processing unit 423. When the job data for printing includes control information on a printer device option, the printing unit 424 provides the control information to the printer device optional unit 427.

A printer device UI control unit 425 is a component configured to use the display unit 313 and the input unit 314 to provide information to the user of the printer device 105 and receive an instruction from the user of the printer device 105.

A printer device configuration generation unit 426 is configured to monitor the printer device optional unit 427 to grasp whether or not an optional apparatus holding a capability that is not defined by a standard attribute defined by the IPP has been added. When an optional apparatus holding an undefined capability has been added, the printer device configuration generation unit 426 generates information for defining and controlling its IPP-undefined printer device configuration information, on the ROM/RAM 307 as an XML file. On the ROM/RAM 307, there is also printer device configuration information held as information for defining and controlling all the capabilities of the printer device, and the printer device configuration information is also generated by the printer device configuration generation unit 426.

Figure 5A:
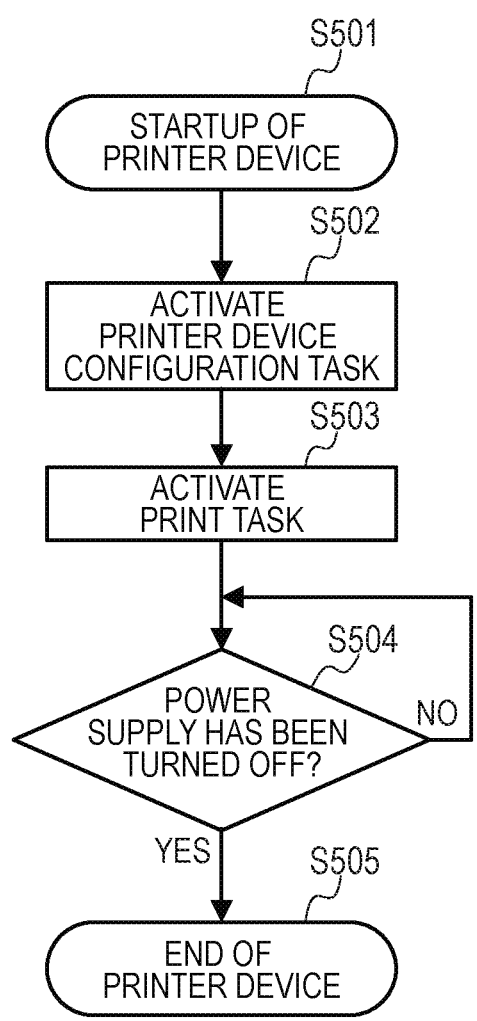
FIG. 5A is a flow chart for illustrating an example of main processing to be performed by the printer device according to one embodiment of the present disclosure.
Figure 5B:
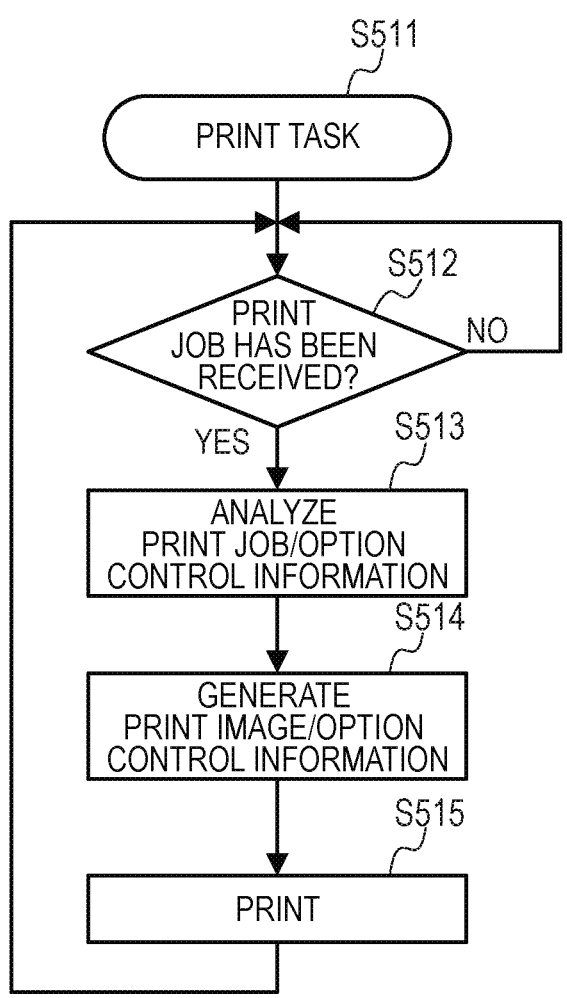
FIG. 5B is a flow chart for illustrating an example of a print task to be performed by the printer device according to one embodiment of the present disclosure.

FIG. 5A and FIG. 5B are flow charts for illustrating examples of main processing and a print task, respectively, to be performed by the printer device 105. FIG. 5A corresponds to the main processing to be performed by the printer device 105, and FIG. 5B corresponds to the print task.

As illustrated in FIG. 5A, when the printer device 105 is powered on, the printer device OS 422 starts printer device startup processing (Step S501), and the processing advances to Step S502.

In Step S502, the printer device OS 422 activates a printer device configuration task. The printer device configuration task, which is described later, corresponds to processing to be performed by the printer device configuration generation unit 426.

Subsequently, in Step S503, the printer device OS 422 activates the print task. The print task is described later in detail with reference to FIG. 5B.

The above-mentioned printer device configuration task of Step S502 and the above-mentioned print task of Step S503 are mutually independent processing tasks, and are assumed to be executed in parallel in the background. When those two tasks are activated, the printer device OS 422 advances the processing to Step S504.

In Step S504, the printer device OS 422 monitors power supply. When the power supply has been turned off (when Step S504 results in Yes), the processing for the printer device is brought to an end (Step S505). At this time, the printer device configuration task and the print task, which are being executed in the background as described above, are simultaneously brought to an end as well.

When the print task is started as illustrated in Step S511 of FIG. 5B, the printer device OS 422 advances the processing to Step S512.

In Step S512, the printer device OS 422 examines whether or not a print job has been received from the terminal apparatus 104. When a print job has not been received (when Step S512 results in No), the printer device OS 422 continuously monitors the reception of a print job.

Meanwhile, when a print job has been received (when Step S512 results in Yes), the printer device OS 422 advances the processing to Step S513.

In Step S513, the printer device OS 422 analyzes the received print job to separate the print job into option control information and print image information (ANALYZE PRINT JOB/OPTION CONTROL INFORMATION).

Subsequently, in Step S514, the printer device OS 422 uses the printing unit 424 to convert the above-mentioned print image information obtained through the separation into a bitmap format that can be printed as it is, and to send the print image information to the printing unit 424 together with control information on an optional device (GENERATE PRINT IMAGE/OPTION CONTROL INFORMATION).

In Step S515, the printing unit 424 generates a print image based on the print image information, and the printer device optional unit 427 controls a printer device option based on the control information on an optional device. When the processing for the print job is completed, the printer device OS 422 returns the processing to Step S512 in order to receive the next print job.

Now, an inquiry for a printer device attribute defined by the IPP is described. The inquiry for the printer device attribute is issued from the terminal apparatus 104 to the printer device 105 by transmitting a "Get-Printer-Attributes Request" from the terminal apparatus 104 to the printer device 105. At this time, when a "Get-Printer-Attributes Request" is transmitted with "all" or nothing being set in "requested-attributes", the "Get-Printer-Attributes Request" serves as a request for inquiring all printer device attributes. When receiving such a request, the printer device 105 returns all "Printer Description Attributes". Meanwhile, when a "Get-Printer-Attributes Request" is transmitted with, for example, a "printer-name" being set, only a name attribute of the printer device 105 is to be inquired. When receiving such a request, the printer device 105 returns only the "printer-name" among the "Printer Description Attributes". In the first embodiment, the former is expressed as "inquiry for all the printer device attributes". The above-mentioned "printer-name" is one of the attributes ("Printer Description Attributes") of the printer device, and hence when the inquiry for all the printer device attributes is issued, the "printer-name" is necessarily included therein.

Now, the concepts of an "IPP-defined printer device attribute" and an "IPP-undefined printer device attribute" to be used in the first embodiment are described as well.

The IPP-defined printer device attribute literally refers to a printer device attribute defined by the IPP Of the IPP-defined printer device attributes, for example, "color-supported" represents a capability of color printing. In addition, "sides-supported" has a value indicating, for example, whether only simplex printing is supported or short-side-aligned duplex printing and long-side-aligned duplex printing are supported.

Meanwhile, the IPP-undefined printer device attribute refers to a printer device attribute that is not defined by the IPP. In the first embodiment, the IPP-undefined printer device attribute is exemplified by an attribute of an optional apparatus called "shift sorter", which is to be added to a printer device. The printer device 105 generates, in the ROM/RAM 307 of the printer device 105, an XML-format file including a name, a setting item, and a setting value that relate to this optional apparatus. In addition, the printer device 105 has a mechanism for setting an address for allowing the terminal apparatus 104 to access the XML file as an attribute value called "printer-more-info-manufacturer" and returning the address to the terminal apparatus 104. This item called "printer-more-info-manufacturer" itself is an item defined by the IPP, but the attribute value having an XML format at a destination of the value indicated by the item is not a value defined by the IPP. Therefore, in the first embodiment, such an attribute is described as the IPP-undefined printer device attribute. In the first embodiment, the above-mentioned XML is expressed as option XML.

Figure 6:
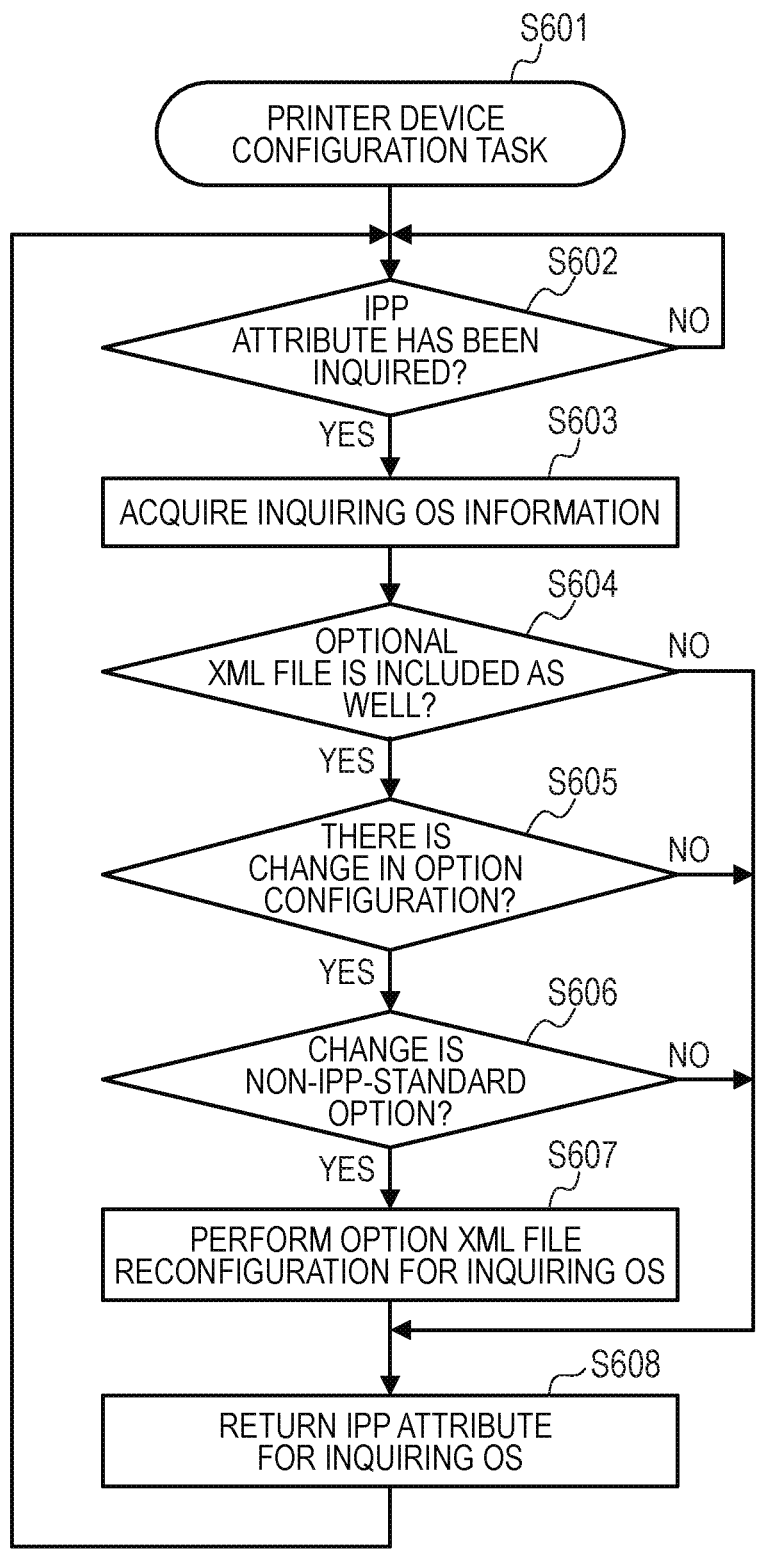
FIG. 6 is a flow chart for illustrating an example of a printer device configuration task to be carried out by the printer device according to the first embodiment.

FIG. 6 is a flow chart for illustrating an example of the printer device configuration task to be carried out by the printer device 105 according to the first embodiment. All the processing steps illustrated in FIG. 6 are executed by the printer device configuration generation unit 426 in response to an instruction received from the printer device OS 422.

After starting the printer device configuration task as illustrated in Step S601 of FIG. 6, the printer device configuration generation unit 426 advances the processing to Step S602.

In Step S602, the printer device configuration generation unit 426 examines whether or not an inquiry for the printer device attribute defined by the IPP has been issued from the terminal apparatus 104. That is, the printer device configuration generation unit 426 examines whether or not there is an inquiry about what kind of capability information the printer device 105 has. When no inquiry for the printer device attribute defined by the IPP has been issued (when Step S602 results in No), the printer device configuration generation unit 426 continuously performs processing for examining whether or not an IPP attribute inquiry has been issued.

Meanwhile, when receiving an inquiry for the printer device attribute defined by the IPP (when Step S602 results in Yes), the printer device configuration generation unit 426 advances the processing to Step S603.

In Step S603, the printer device configuration generation unit 426 analyzes the inquiry for the printer device attribute, which has been transmitted from the terminal apparatus 104, to examine the type of the OS 412 operating on the terminal apparatus 104 that has issued the inquiry for the printer device attribute (ACQUIRE INQUIRING OS INFORMATION). Examples of the type of the OS 412 include Windows (trademark), Android (trademark), MacOS (trademark), iOS (trademark), Linux (trademark), which are widespread nowadays. When the OS cannot be discriminated based on the transmitted request information, it is assumed that the IPP attribute inquiry has been issued from Windows, which is generally widespread. The first embodiment is not limited to the assumption that the IPP attribute inquiry has been issued from Windows.

Subsequently, in Step S604, the printer device configuration generation unit 426 examines whether or not the attribute of "printer-more-info-manufacturer" being an IPP standard attribute (attribute defined by the IPP standard) is included in the inquiry for the printer device attribute. In regard to an inquiry for an attribute of the IPP, the attribute of "printer-more-info-manufacturer" is included in the inquiry for the printer device attribute when all the printer device attributes are to be inquired and when only this attribute is to be inquired.

When it is determined in Step S604 that the attribute of "printer-more-info-manufacturer" being an IPP standard attribute is not included in the inquiry for the printer device attribute (when Step S604 results in No), the printer device configuration generation unit 426 advances the processing to Step S608. The processing of Step S608 is described later.

Meanwhile, when it is determined that the attribute of "printer-more-info-manufacturer" being an IPP standard attribute is included in the inquiry for the printer device attribute (when Step S604 results in Yes), the printer device configuration generation unit 426 advances the processing to Step S605.

In Step S605, the printer device configuration generation unit 426 determines whether or not there is a change in the option configuration. In more detail, the printer device configuration generation unit 426 examines whether or not the printer device configuration information held (configuration information stored) on the ROM/RAM 307 as the information for defining and controlling all the capabilities of the relevant apparatus matches the most recent configuration information. The printer device configuration information referred to here is a combination of the IPP-defined printer device attribute and the IPP-undefined printer device attribute, and their initial values are values indicating states exhibited when the printer device 105 is shipped from a factory, and are each stored on the ROM/RAM 307. The IPP-undefined printer device configuration information has its value updated in accordance with the result of Step S607 described later. In addition, the most recent configuration information is configuration information that has so far been examined by being inquired from the printer device optional unit 427 by the printer device configuration generation unit 426.

When it is determined in Step S605 that the stored configuration information matches the most recent configuration information, that is, there is no change in the option configuration (when Step S605 results in No), the printer device configuration generation unit 426 advances the processing to Step S608.

Meanwhile, when it is determined that the stored configuration information does not match the most recent configuration information, that is, there is a change in the option configuration (when Step S605 results in Yes), the printer device configuration generation unit 426 advances the processing to Step S606.

In Step S606, the printer device configuration generation unit 426 examines whether or not the above-mentioned change in the option configuration is a change in a component corresponding to an IPP-undefined apparatus capability (for example, addition of a shift sorter). The change in the IPP-undefined (non-IPP-standard) apparatus capability corresponds to, for example, the fact that the shift sorter has been added. Meanwhile, a change in an IPP-defined apparatus capability refers to a change in an attribute defined in the standard attributes of the IPP, and corresponds to, for example, the fact that a duplex printing mechanism has been added.

When it is determined in Step S606 that the change in the option configuration is not a change in the component corresponding to an IPP-undefined apparatus capability (when Step S606 results in No), the printer device configuration generation unit 426 advances the processing to Step S608.

Meanwhile, when it is determined that the change in the option configuration is a change in the component corresponding to an IPP-undefined apparatus capability (when Step S606 results in Yes), the printer device configuration generation unit 426 advances the processing to Step S607.

In Step S607, the printer device configuration generation unit 426 performs option XML file reconfiguration processing for the inquiring OS. Having determined that there is a change in the IPP-undefined printer device configuration information held on the ROM/RAM 307, the printer device configuration generation unit 426 reconfigures the option XML file indicating the IPP-undefined printer device configuration information into correct information in the option XML file reconfiguration processing. For example, the printer device configuration generation unit 426 configures such IPP-undefined printer device configuration information as described later with reference to FIG. 11.

Subsequently, in Step S608, the printer device configuration generation unit 426 returns the inquired attribute of the IPP (RETURN IPP ATTRIBUTE FOR INQUIRING OS). At this time, when all the attributes have been inquired, the printer device configuration generation unit 426 returns all the attribute values (returns the attribute values of the attributes that have been inquired). Meanwhile, when only the attribute of "printer-more-info-manufacturer" has been inquired, the printer device configuration generation unit 426 returns its attribute value (address value described below). The attribute value of "printer-more-info-manufacturer" is an address value for access to the option XML file indicating the IPP-undefined printer device configuration information generated on the ROM/RAM 307, and is not the option XML file itself. Examples of the address value include a URL. After the processing of Step S608, the printer device configuration generation unit 426 returns the processing to Step S602.

Figure 7:
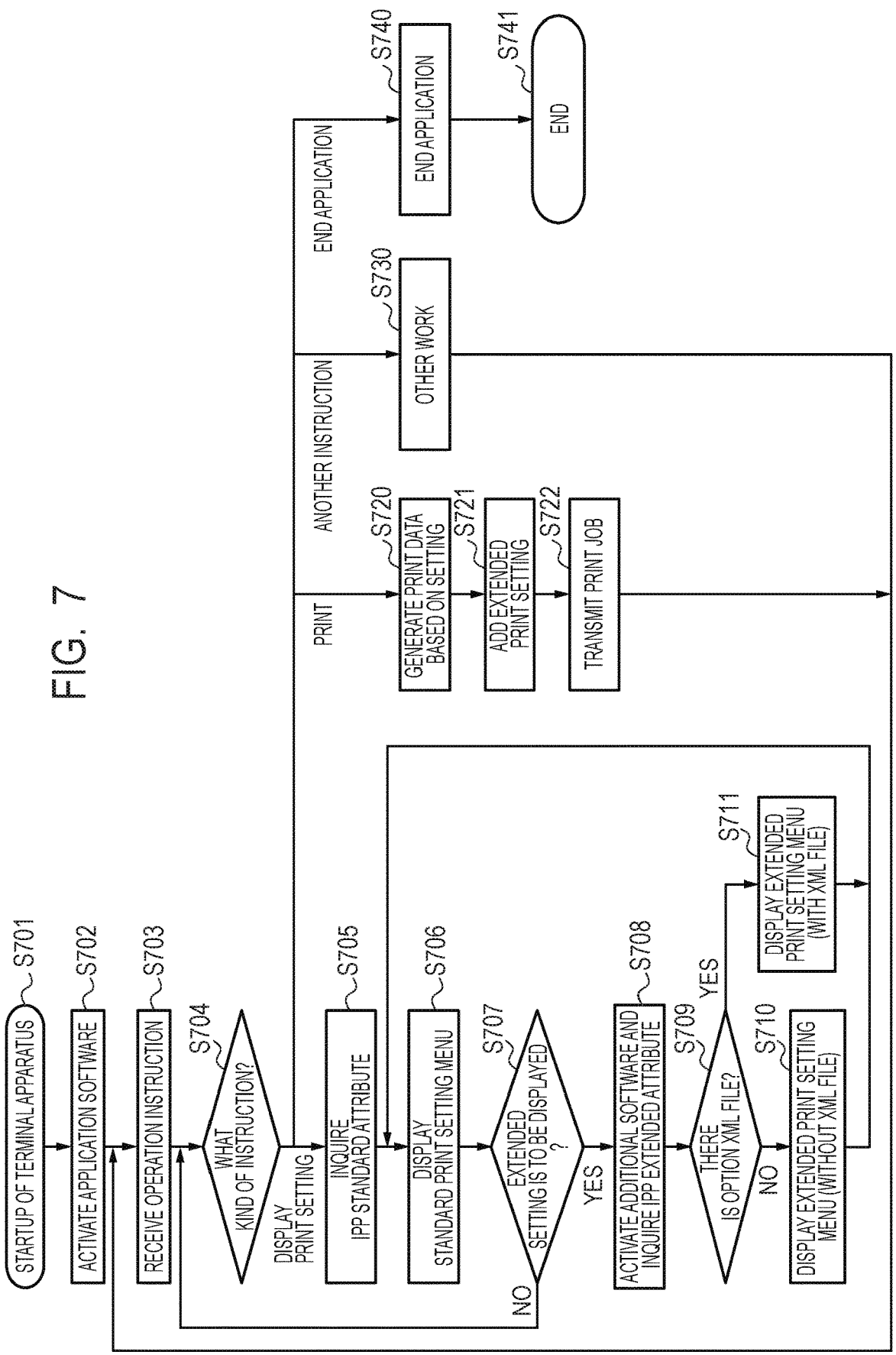
FIG. 7 is a flow chart for illustrating an example of terminal apparatus startup processing to be carried out by the terminal apparatus according to the first embodiment.

FIG. 7 is a flow chart for illustrating an example of terminal apparatus startup processing to be carried out by the terminal apparatus 104 in the first embodiment.

When the terminal apparatus 104 is started up as illustrated in Step S701 of FIG. 7, the OS 412 is ready to activate the application software 415 (for example, word processor software or spreadsheet software) stored on the ROM/RAM 207 so as to operate. When instructed to activate the application software 415, the OS 412 advances the processing to Step S702.

In Step S702, the OS 412 activates the application software 415, and starts the use of the application software 415.

Subsequently, in Step S703, the application software 415 receives an operation instruction with respect to the application software 415 (RECEIVE OPERATION INSTRUCTION). The operation instruction with respect to the application software 415 refers to a general operation instruction, for example, a data creation instruction, a data display instruction, a print setting display instruction (instruction to display a print setting for printing), or a print instruction. When receiving an operation instruction, the application software 415 advances the processing to Step S704.

In Step S704, the application software 415 examines the kind of operation instruction received in Step S703. When the above-mentioned operation instruction is "DISPLAY PRINT SETTING", the application software 415 advances the processing to Step S705.

In Step S705, the application software 415 instructs the OS 412 to display a print setting, to thereby display a print setting through use of the printer driver 416. At this time, the printer driver 416 issues an instruction to the OS 412 to acquire printer device configuration information to be required for displaying the print setting. In response to this instruction, the OS 412 transmits an IPP attribute inquiry to the printer device 105 (INQUIRE IPP STANDARD ATTRIBUTE). In response to the IPP attribute inquiry, the printer device 105 returns the IPP standard attribute. The OS 412 transmits the IPP standard attribute acquired from the printer device 105 to the printer driver 416.

Subsequently, in Step S706, the printer driver 416 displays a standard print setting menu 1001 illustrated in FIG. 8 and FIG. 9 on the UI control unit 414 based on the IPP standard attribute acquired in Step S705 (DISPLAY STANDARD PRINT SETTING MENU).

Figure 8:
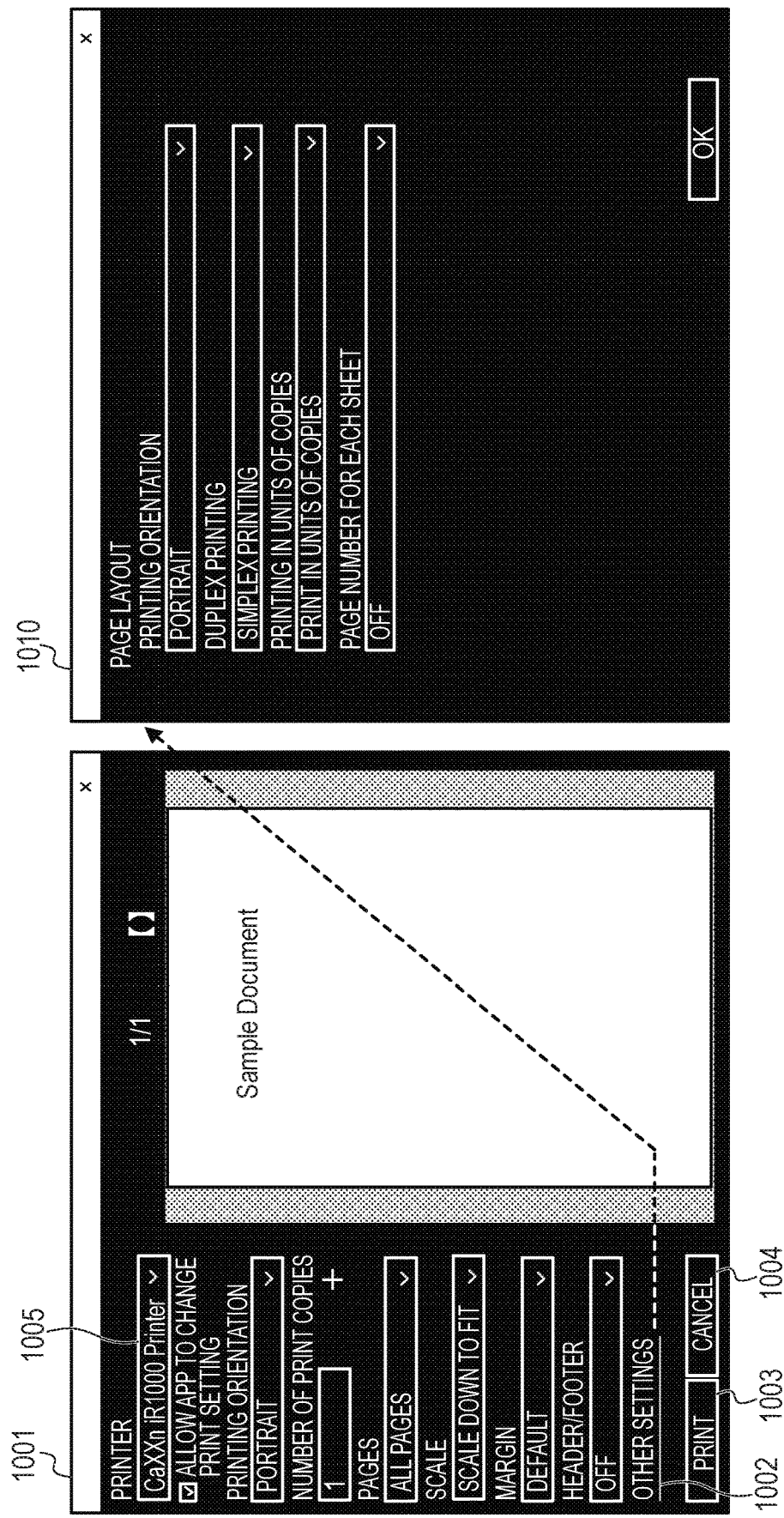
FIG. 8 is a diagram for illustrating an example of a printer driver UI screen that does not include a print setting for a vendor-specific optional apparatus according to one embodiment of the present disclosure.
Figure 9:
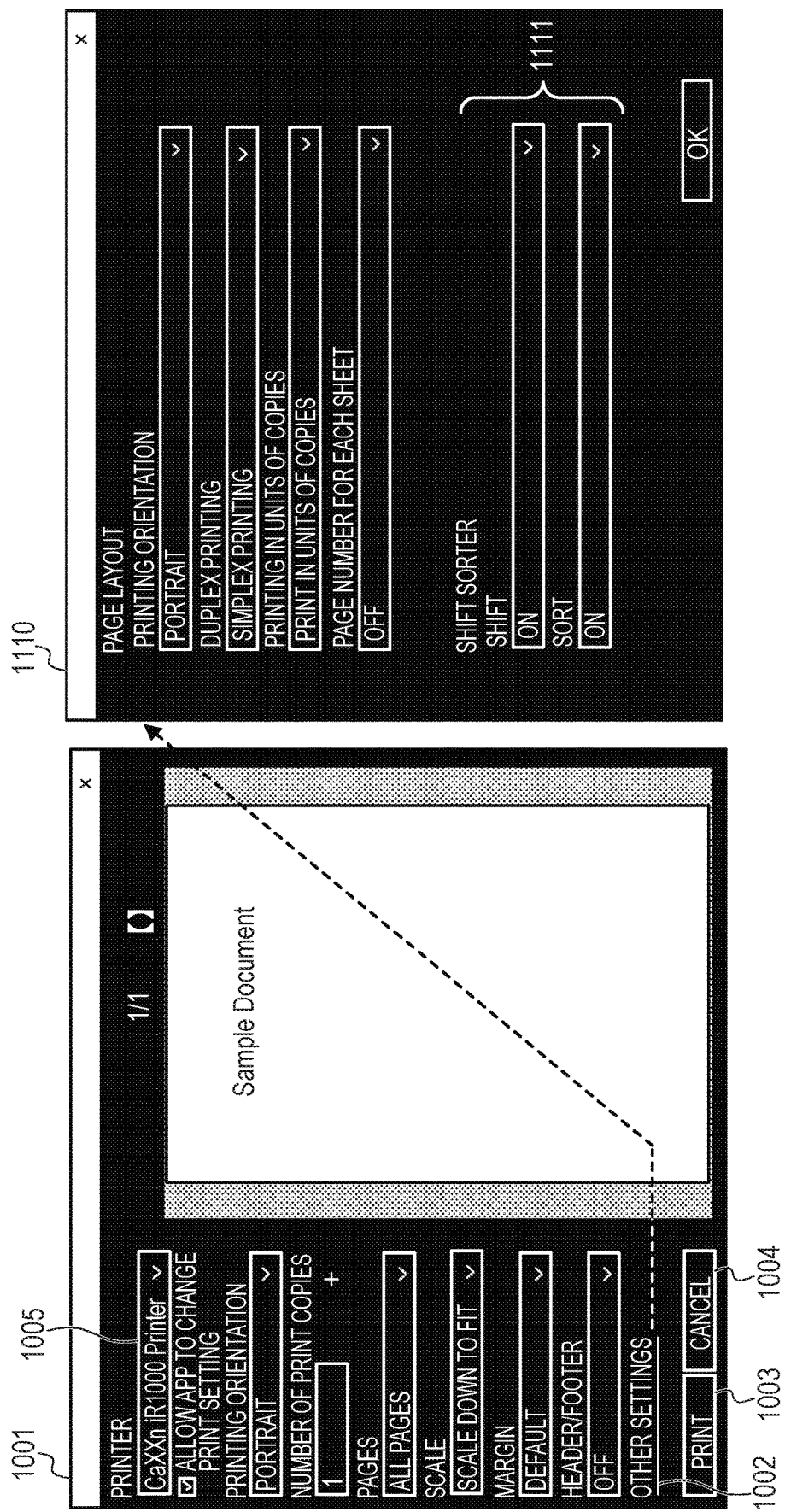
FIG. 9 is a diagram for illustrating an example of a printer driver UI screen including a print setting for a vendor-specific optional apparatus according to one embodiment of the present disclosure.

FIG. 8 and FIG. 9 are diagrams for illustrating examples of printer driver UI screens.

In Step S707, the printer driver 416 receives the operation instruction from the standard print setting menu 1001, and determines whether or not an extended print setting, which is detailed print setting information, is to be displayed in accordance with the received operation instruction. Specifically, "OTHER SETTINGS" 1002 illustrated in FIG. 8 and FIG. 9 is instructed on the UI control unit 414 through use of the input unit 212, the printer driver 416 determines that the extended print setting is to be displayed. When "PRINT" 1003 illustrated in FIG. 8 and FIG. 9 or "CANCEL" 1004 illustrated in FIG. 8 and FIG. 9 is instructed, the printer driver 416 determines that the extended print setting is not to be displayed. When an instruction to, for example, change the print setting on the standard print setting menu 1001 is issued, in Step S707, the printer driver 416 continuously receives an operation instruction from the standard print setting menu 1001 to determine whether or not the extended print setting is to be displayed.

When it is determined in Step S707 that the extended print setting is to be displayed (when Step S707 results in Yes), the printer driver 416 advances the processing to Step S708.

In Step S708, the printer driver 416 instructs the OS 412 to activate the additional software 417. The additional software 417 is software provided by the vendor of the printer device 105 selected in a printer field 1005 illustrated in FIG. 8 and FIG. 9. When the additional software 417 is not installed on the terminal apparatus 104 in advance, the additional software 417 cannot be activated, and hence the printer driver 416 is assumed to return the processing to Step S703.

When a value is set in the attribute of "printer-more-info-manufacturer" being an IPP standard attribute, the activated additional software 417 acquires, from its address destination, the XML file indicating the IPP-undefined printer device configuration information. Then, the additional software 417 loads the information of the acquired XML file onto the ROM/RAM 207. When no value is set in the attribute of "printer-more-info-manufacturer", the XML file cannot be acquired.

Subsequently, in Step S709, the additional software 417 examines whether or not the XML file indicating the IPP-undefined printer device configuration information was successfully acquired in Step S708. When the XML file failed to be acquired (when Step S709 results in No), the additional software 417 advances the processing to Step S710.

In Step S710, the additional software 417 displays an extended print setting menu without XML information indicating the IPP-undefined printer device configuration information. For example, an extended print setting menu 1010 is displayed as illustrated in FIG. 8. After a setting operation and other such operations have been completed in the extended print setting menu, the printer driver 416 returns the processing to Step S706, and returns the display content to the standard print setting menu 1001.

Meanwhile, when it is determined in Step S709 that the XML file indicating the IPP-undefined printer device configuration information has been successfully acquired (when Step S709 results in Yes), the printer driver 416 advances the processing to Step S711.

In Step S711, the additional software 417 generates and displays an extended print setting menu based on the XML information (for example, information with a shift sorter) indicating the IPP-undefined printer device configuration information, which was acquired in Step S708. For example, an extended print setting menu 1110, which includes a print setting item 1111 for instructing whether or not to use a shift sorter, is displayed as illustrated in FIG. 9. The extended print setting menu 1010 of FIG. 8 and the extended print setting menu 1110 of FIG. 9 are different in whether or not the print setting item 1111 relating to a shift sorter is displayed. The first embodiment is described on the assumption that the print setting relating to a shift sorter is the IPP-undefined printer device configuration information, but the IPP-undefined printer device configuration information is not limited solely thereto. After a setting operation and other such operations have been completed in the extended print setting menu, the printer driver 416 returns the processing to Step S706, and returns the display content to the standard print setting menu 1001.

A print setting value relating to the optional apparatus, which is indicated by the IPP-undefined printer device configuration information, is reserved inside the additional software 417, and the printer driver 416 is not notified of the print setting value. This is because the printer driver 416 being a general-purpose printer driver has no information relating to the IPP-undefined printer device configuration information, and therefore cannot handle the print setting value.

Meanwhile, when the "PRINT" 1003 illustrated in FIG. 8 and FIG. 9 or the "CANCEL" 1004 illustrated in FIG. 8 and FIG. 9 is instructed in Step S707, the printer driver 416 determines that the extended print setting is not to be displayed (No in Step S707), and returns the processing to Step S704.

When it is determined in Step S704 that the received operation instruction described above is "PRINT", that is, the "PRINT" 1003 illustrated in FIG. 8 and FIG. 9 has been instructed, the application software 415 advances the processing to Step S720.

In Step S720, data created by the application software 415 is passed to the printer driver 416. The printer driver 416 generates print data (job for printing) from the data created by the application software 415 based on print setting details displayed or set in the standard print setting menu and the extended print setting menu.

Subsequently, in Step S721, when there is a setting of a print setting value relating to the optional apparatus, which is indicated by the IPP-undefined printer device configuration information reserved inside the additional software 417, the additional software 417 adds information on the setting to the job for printing, which was generated in Step S720.

Subsequently, in Step S722, the additional software 417 transmits the print data generated by the printer driver 416 and added by the additional software 417 to the printer device 105 as a print job. Job data on the print job transmitted in this case is exemplified in FIG. 10, which is described later. After completing the transmission of the print job, the printer driver 416 returns the processing to Step S703.

When it is determined in Step S704 that the operation instruction received in Step S703 is another instruction different from any one of "DISPLAY PRINT SETTING", "PRINT", and "END APPLICATION", the application software 415 advances the processing to Step S730.

In Step S730, the application software 415 performs processing corresponding to an instructed operation, for example, an operation for setting a printing orientation, the number of print copies, pages, a scale, a margin, and a header and a footer. After completing the processing, the application software 415 returns the processing to Step S703.

Meanwhile, when it is determined in Step S704 that the operation instruction received in Step S703 is "END APPLICATION", the application software 415 advances the processing to Step S740.

In Step S730, the application software 415 brings the processing to an end, and the OS 412 performs closing processing on the application software 415 to bring the processing of the present flow chart to an end (Step S741).

Figure 10:
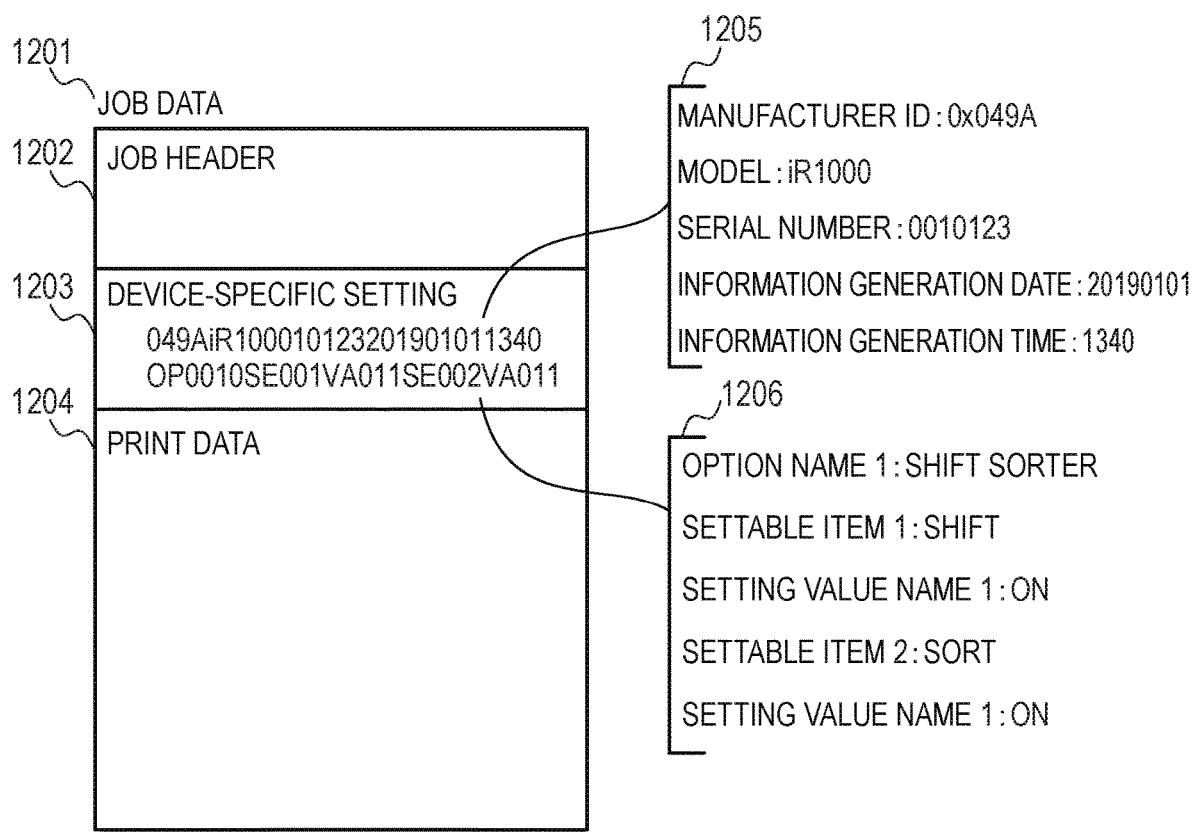
FIG. 10 is a diagram for conceptually illustrating an example of a format of a print job to be transmitted to the printer device according to one embodiment of the present disclosure.

FIG. 10 is a diagram for conceptually illustrating an example of a format of the print job to be transmitted to the printer device 105 by the additional software 417 in Step S722 "TRANSMIT PRINT JOB" of FIG. 7.

As illustrated in FIG. 10, job data 1201 is roughly formed of three parts, namely, a job header 1202, a device-specific setting 1203, and print data 1204.

The job header 1202 and the device-specific setting 1203 are collectively referred to as "print ticket" in some cases, and control information for a print job is stored in the print ticket. In the first embodiment, the print ticket is provided in its inside with an area for the device-specific setting 1203, and the relevant device-specific setting information is stored in the area to provide information for controlling the printer device 105.

Specifically, information 1205 in the print ticket holds a manufacturer of the printer device 105, a model name, and a serial number. Thus, it is possible to determine whether or not the printer device 105 is a device that can accept the relevant device-specific setting based on the relevant print ticket. An information generation date and information generation time are also held in the print ticket, and it is possible to grasp the time point of issuing the IPP-undefined printer device configuration information based on which the device that is to accept the relevant device-specific setting was set.

Specifically, information 1206 is information for controlling the optional apparatus that accompanies the printer device 105. In this example, an operation of using a shift sorter apparatus to carry out a shift sort function and to further carry out a sort function is instructed.

All the details of the specifications of the information 1205 and the information 1206 are converted into data and embedded in the job data 1201.

The print data 1204 is data for printing to be created by the printer driver 416 in a format defined by the IPP, and is generally PDF or PWG-RASTER format data.

FIG. 11 is a diagram for illustrating an example of XML (option XML) data generated in the printer device 105 as IPP-undefined printer device configuration information in the first embodiment.

In the example illustrated in FIG. 11, "CA○○N" is set as a "MANUFACTURER NAME", and "0x049A" is set as a "MANUFACTURER ID". It suffices that the "MANUFAC- TURER ID" is a value that can uniquely identify the manufacturer. As a "MODEL", "iR1000" is set, and "0010123" is set as a "SERIAL NUMBER" of the product. The value "20190101" of the "INFORMATION GENERATION DATE" and the value "1340" of the "INFORMATION GENERATION TIME" indicate a date and a time, respectively, at which the IPP-undefined printer device configuration information was generated.

The optional apparatus that accompanies the printer device 105 can be mounted or removed at a suitable timing. In a case where a print job generated at a given timing during a period during which the optional apparatus is installed is temporarily held somewhere, when the print job is later transmitted to the printer device 105, there is a possibility that the optional apparatus may have been changed to another optional apparatus by the timing of the transmission. In that case, the device-specific setting 1203 embedded in the print job, which is illustrated in FIG. 10, becomes information that cannot be used correctly. The pieces of information on the information generation date and information generation time are included in the IPP-undefined printer device configuration information so as to be used as reference information for grasping the device-specific setting 1203.

The option XML file includes information on the "OPTION COUNT" indicating the number of optional apparatus. In the example of FIG. 11, the "OPTION COUNT" is set to "1", to thereby indicate that there is one optional apparatus that accompanies the printer device 105.

In a tier lower by one step than the "OPTION COUNT", a name "SHIFT SORTER" is set as an "OPTION NAME 1", and "OP0010" is set as an "OPTION ID 1". The value "OP0010" indicates the shift sorter. In addition, a "SETTABLE ITEM COUNT 1" for the shift sorter is set to "2", to thereby indicate that there are two settable items.

In a tier lower by one more step, the name "SHIFT" is set as a "SETTABLE ITEM 1", and "SE001" is set as "SETTABLE ITEM ID 1". The value "SE001" indicates "SHIFT". A "SETTING VALUE COUNT 1" for the value "SHIFT" is set to "2", to thereby indicate that there are two settable values. The setting values for the value "SHIFT" are described in a tier lower by still one more step.

In the tier lower by still one more step, the name "ON" is set as a "SETTING VALUE NAME 1", "VA01" is set as a "VALUE ID 1", and "1" is set as a "VALUE 1". In this case, it is indicated that the displayed name "ON" has the ID of "VA01" and has the value of "1".

In addition, the name "OFF" is set as a "SETTING VALUE NAME 2", "VA02" is set as a "VALUE ID 2", and "2" is set as a "VALUE 2". In this case, it is indicated that the displayed name "OFF" has the ID of "VA02" and has the value of "2".

In the tier higher by one more step, the name "SORT" is set as a "SETTABLE ITEM 2", and "SE002" is set as "SETTABLE ITEM ID 2". The value "SE002" indicates "SORT". A "SETTING VALUE COUNT 2" for the value "SORT" is set to "2", to thereby indicate that there are two settable values. The setting values for the value "SORT" are described in a tier lower by still one more step.

In the tier lower by still one more step, the name "ON" is set as a "SETTING VALUE NAME 1", "VA01" is set as a "VALUE ID 1", and "1" is set as a "VALUE 1". In this case, it is indicated that the displayed name "ON" has the ID of "VA01" and has the value of "1".

Although the example described above is merely an example, it is understood that each character string representing a name to be displayed and the ID and value that indicate the item are held as a set. It is assumed that the character string representing the name to be displayed is used as it is in the display of the extended print setting menu (with an XML file) in Step S711 of FIG. 7. For example, when the print setting item 1111 in the lower half of a screen for the extended print setting menu 1110 of FIG. 9 is displayed in the case of the extended print setting menu (with an XML file), the character string "SHIFT SORTER" is the value itself of the "OPTION NAME 1". The character string "SHIFT" is the value itself of the "SETTABLE ITEM 1". The character string "ON" is the value itself of the "SETTING VALUE NAME 1".

This allows the additional software 417 to display the screen for the extended print setting menu 1110 through use of the IPP-undefined printer device configuration information during the processing for the extended print setting menu (with an XML file) in Step S711 of FIG. 7.

The option XML file handled in the first embodiment is formed of four layers (manufacturer name layer, option name layer, settable item name layer, and setting value name layer). However, as long as how the option XML file is structured is synchronized between the additional software 417 and the printer device 105, no particular limitations are imposed on the structure of the option XML file.

When selection items are selected in the respective setting items, the additional software 417 embeds the IDs and values corresponding to the items in pairs in the device-specific setting 1203. Thus, it is possible to inform through the print job what kind of items were selected during the processing for the extended print setting menu (with an XML file) in Step S711 of FIG. 7.

In the above-mentioned example of FIG. 11, the names of the different kinds of items are written in English, but the present disclosure is not limited to English, and character strings based on language information set in the printer device 105 in advance may be employed.

As described above, according to the first embodiment, the information (IPP-undefined printer device configuration information) relating to a vendor-specific optional apparatus, which cannot be included in a general-purpose printer driver, can be transmitted from a printer device to a terminal apparatus through use of a standard attribute included in the IPP.

Further, the print setting relating to the optional apparatus can be correctly recognized on the terminal apparatus, and can be controlled by being displayed on a print setting screen of the printer driver. Then, it is possible to generate a print job for controlling a vendor-specific optional apparatus on the terminal apparatus, and to obtain a desired printing result by generating such a print job and outputting the print job to the printer device.

In this manner, the terminal apparatus can be correctly informed of the configuration of the printer device including the vendor-specific optional apparatus, to thereby enable full use of the capabilities of the printer device.

Second Embodiment

In the first embodiment, the configuration in which the printer device creates the printer device configuration information (option XML file) for the OS of the terminal apparatus inquiring the printer device configuration has been described. In a second embodiment of the present disclosure, a configuration in which the printer device creates printer device configuration information for all OSs that can be assumed to be installed on the terminal apparatus is described. Detailed description thereof is given below, but the descriptions of the same components as those of the first embodiment are omitted.

Figure 12:
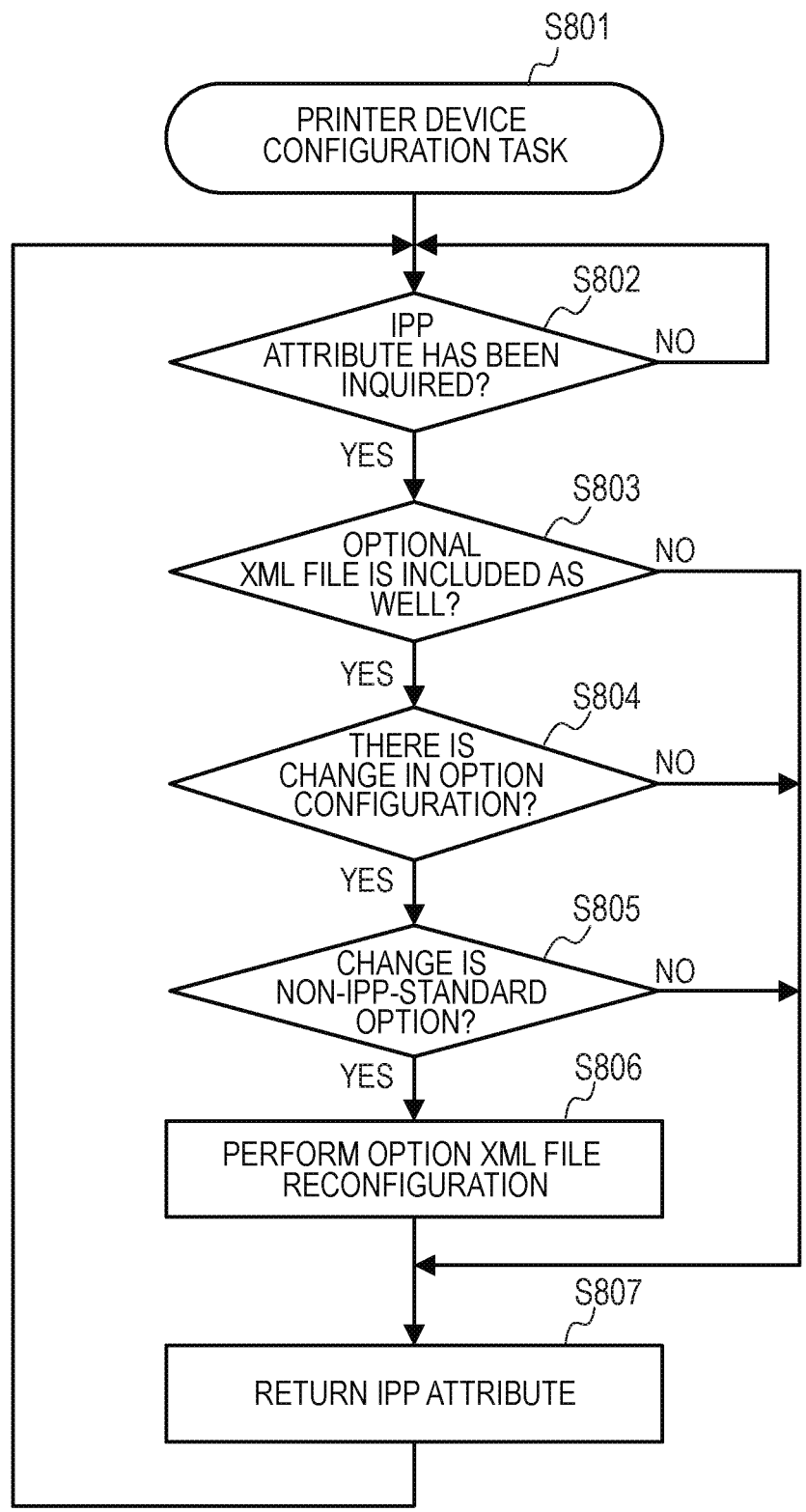
FIG. 12 is a flow chart for illustrating an example of the printer device configuration task to be carried out by a printer device according to a second embodiment of the present disclosure.

FIG. 12 is a flow chart for illustrating an example of the printer device configuration task to be carried out by the printer device 105 according to the second embodiment. All the processing steps illustrated in FIG. 12 are executed by the printer device configuration generation unit 426 in response to an instruction received from the printer device OS 422.

After starting the printer device configuration task as illustrated in Step S801 of FIG. 12, the printer device configuration generation unit 426 advances the processing to Step S802.

In Step S802, in the same manner as in Step S602 of FIG. 6, the printer device configuration generation unit 426 examines whether or not an inquiry for the printer device attribute defined by the IPP has been issued from the terminal apparatus 104. When no inquiry for the printer device attribute defined by the IPP has been issued (when Step S802 results in No), the printer device configuration generation unit 426 continuously performs processing for examining whether or not an IPP attribute inquiry has been issued.

Meanwhile, when receiving an inquiry for the printer device attribute defined by the IPP (when Step S802 results in Yes), the printer device configuration generation unit 426 advances the processing to Step S803.

In the printer device configuration task in the first embodiment illustrated in FIG. 6, the examination of the inquiring OS information is performed after Step S602, but is not performed in the second embodiment. This is because, in the second embodiment, the printer device configuration information is created for all OSs that can be assumed.

In Step S803, in the same manner as in Step S604 of FIG. 6, the printer device configuration generation unit 426 examines whether or not the attribute of "printer-more-info-manufacturer" being an IPP standard attribute is included in the inquiry for the printer device attribute. When it is determined that the attribute of "printer-more-info-manufacturer" being an IPP standard attribute is not included in the inquiry for the printer device attribute (when Step S803 results in No), the printer device configuration generation unit 426 advances the processing to Step S807. The processing of Step S807 is described later.

Meanwhile, when it is determined that the attribute of "printer-more-info-manufacturer" being an IPP standard attribute is included in the inquiry for the printer device attribute (when Step S803 results in Yes), the printer device configuration generation unit 426 advances the processing to Step S804.

In Step S804, in the same manner as in Step S605 of FIG. 6, the printer device configuration generation unit 426 determines whether or not there is a change in the option configuration. When it is determined that there is no change in the option configuration (when Step S804 results in No), the printer device configuration generation unit 426 advances the processing to Step S807.

Meanwhile, when it is determined that there is a change in the option configuration (when Step S804 results in Yes), the printer device configuration generation unit 426 advances the processing to Step S805.

In Step S805, in the same manner as in Step S606 of FIG. 6, the printer device configuration generation unit 426 examines whether or not the above-mentioned change in the option configuration is a change in a component corresponding to an IPP-undefined apparatus capability (for example, addition of a shift sorter). When it is determined that the change in the option configuration is not a change in the component corresponding to an IPP-undefined apparatus capability (when Step S805 results in No), the printer device configuration generation unit 426 advances the processing to Step S807.

Meanwhile, when it is determined that the change in the option configuration is a change in the component corresponding to an IPP-undefined apparatus capability (when Step S805 results in Yes), the printer device configuration generation unit 426 advances the processing to Step S806.

In Step S806, the printer device configuration generation unit 426 performs option XML file reconfiguration processing. Having determined that there is a change in the IPP-undefined printer device configuration information held on the ROM/RAM 307, the printer device configuration generation unit 426 reconfigures the option XML file indicating the IPP-undefined printer device configuration information into correct information in the option XML file reconfiguration processing. For example, the printer device configuration generation unit 426 configures such IPP-undefined printer device configuration information as described later with reference to FIG. 14.

Subsequently, in Step S807, the printer device configuration generation unit 426 returns the inquired attribute of the IPP (RETURN IPP ATTRIBUTE). At this time, when all the attributes have been inquired, the printer device configuration generation unit 426 returns all the attribute values (returns the attribute values of the attributes that have been inquired). Meanwhile, when only the attribute of "printer-more-info-manufacturer" has been inquired, the printer device configuration generation unit 426 returns its attribute value (address value described below). The attribute value of "printer-more-info-manufacturer" is an address value for access to the option XML file indicating the IPP-undefined printer device configuration information generated on the ROM/RAM 307, and is not the option XML file itself. After the processing of Step S807, the printer device configuration generation unit 426 returns the processing to Step S802.

Figure 13:
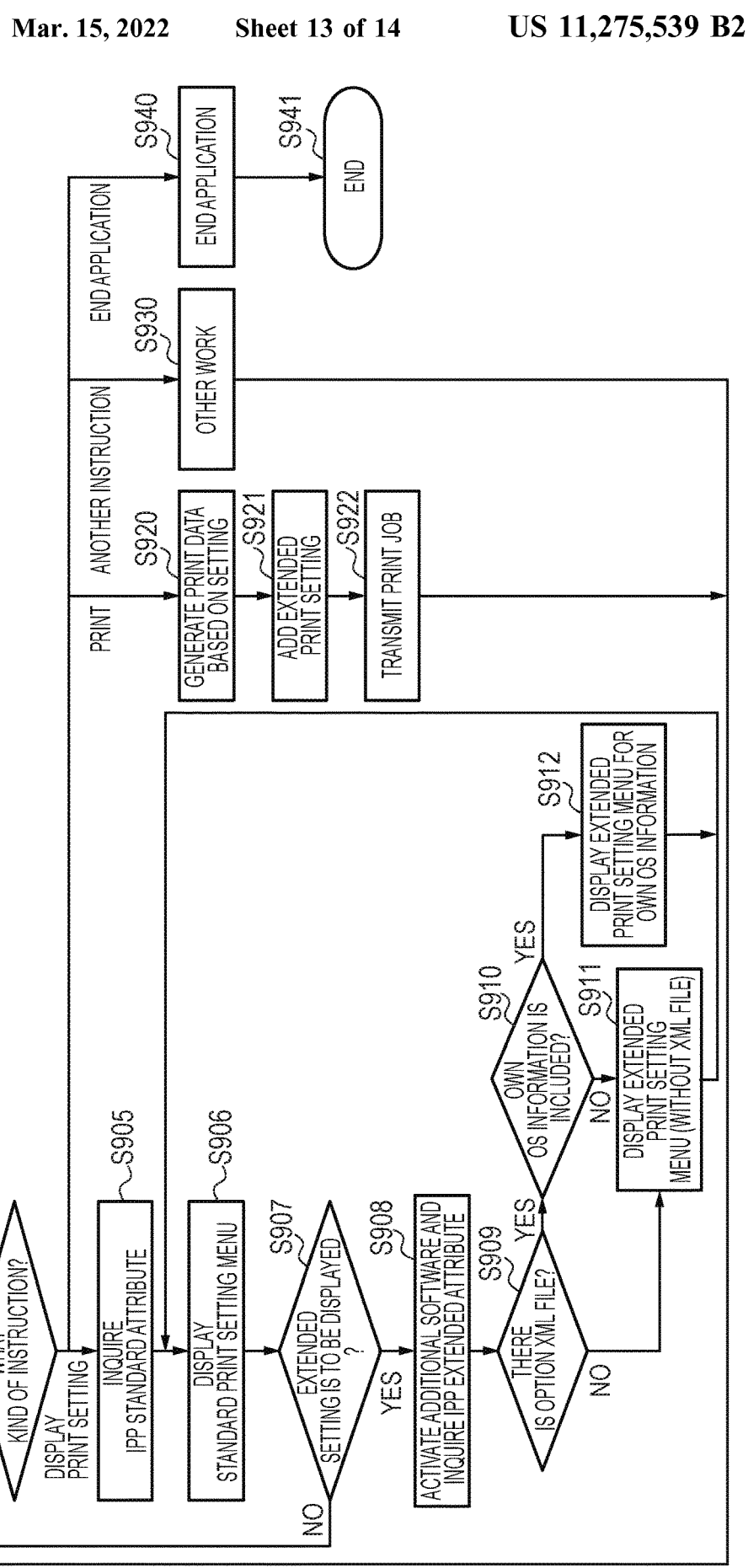
FIG. 13 is a flow chart for illustrating an example of terminal apparatus startup processing to be carried out by a terminal apparatus according to the second embodiment.

FIG. 13 is a flow chart for illustrating an example of terminal apparatus startup processing to be carried out by the terminal apparatus 104 in the second embodiment.

When the terminal apparatus 104 is started up as illustrated in Step S901 of FIG. 13, the OS 412 is ready to activate the application software 415 (for example, word processor software or spreadsheet software) stored on the ROM/RAM 207 so as to operate. When instructed to activate the application software 415, the OS 412 advances the processing to Step S902. The processing of from Step S902 to Step S909 and Step S911 is the same as the processing of from Step S702 to Step S709 and Step S710 illustrated in FIG. 7, and hence description thereof is omitted. However, in the second embodiment, the additional software 417 executes the processing of Step S910 when the XML file indicating the IPP-undefined printer device configuration information was successfully acquired in Step S908 (when Step S909 results in Yes).

In Step S910, the additional software 417 searches the XML file indicating the IPP-undefined printer device configuration information, which was acquired in Step S908, to examine whether or not the information (own OS information) for the OS of the terminal apparatus 104 is included in the XML file. Now, a case in which the XML file indicating the IPP-undefined printer device configuration information, which was acquired in Step S908, has such details as described later with reference to FIG. 14 is described as an example. In the case of this example, when the OS of the terminal apparatus 104 is any one of Windows, Macintosh, and Linux, the additional software 417 determines that the own OS information is included. Meanwhile, when the OS of the terminal apparatus 104 is another OS different from any one of Windows, Macintosh, and Linux (for example, when the OS is Android OS), the additional software 417 determines that the own OS information is not included.

In Step S910, when the own OS information is not included (when Step S910 results in No), the additional software 417 advances the processing to Step S911.

Meanwhile, when the own OS information is included (when Step S910 results in Yes), the additional software 417 advances the processing to Step S912.

In Step S912, the additional software 417 generates and displays an extended print setting menu based on the own OS information in the XML file (for example, information with a shift sorter) indicating the IPP-undefined printer device configuration information, which was acquired in Step S908. For example, an extended print setting menu 1110, which includes a print setting item 1111 for instructing whether or not to use a shift sorter, is displayed as illustrated in FIG. 9. The extended print setting menu 1010 of FIG. 8 and the extended print setting menu 1110 of FIG. 9 are different in whether or not the print setting item 1111 relating to a shift sorter is displayed. The second embodiment is described on the assumption that the print setting relating to a shift sorter is the IPP-undefined printer device configuration information, but the IPP-undefined printer device configuration information is not limited solely thereto. After a setting operation and other such operations have been completed in the extended print setting menu, the printer driver 416 returns the processing to Step S906, and returns the display content to the standard print setting menu 1001.

A print setting value relating to the optional apparatus, which is indicated by the IPP-undefined printer device configuration information, is reserved inside the additional software 417, and the printer driver 416 is not notified of the print setting value. This is because the printer driver 416 being a general-purpose printer driver has no information relating to the IPP-undefined printer device configuration information, and therefore cannot handle the print setting value.

The processing of from Step S920 to Step S922, Step S930, and Step S940 is the same as the processing of from Step S720 to Step S722, Step S730, and Step S740 illustrated in FIG. 7, and hence description thereof is omitted.

FIG. 14 is a diagram for illustrating an example of XML (option XML) data generated in the printer device 105 as IPP-undefined printer device configuration information in the second embodiment.

Points different from the XML data in the first embodiment illustrated in FIG. 11 are described below.

First, the items of the "MANUFACTURER NAME", the "MANUFACTURER ID", the "SERIAL NUMBER", the "INFORMATION GENERATION DATE", and the "INFORMATION GENERATION TIME" are the same as those of the XML data in the first embodiment illustrated in FIG. 11.

The XML file in the second embodiment includes an item of a "SUPPORTED OS COUNT" in the same tier as that of those items. The item of the "SUPPORTED OS COUNT" indicates the number of types of OSs supported by this XML file. In the example of FIG. 14, "3" is set as the "SUPPORTED OS COUNT". That is, the example illustrated in FIG. 14 indicates that the IPP-undefined printer device configuration information is provided for three types of OSs.

In a tier lower by one step than the "SUPPORTED OS COUNT", the IPP-undefined printer device configuration information is described for each of OSs corresponding to the number set as the "SUPPORTED OS COUNT".

The IPP-undefined printer device configuration information for each OS includes items of an "OS NAME n", an "OS ID n", and the "OPTION COUNT n" (where "n" represents a natural number of from 1 to the supported OS count). The name of the OS is set as the "OS NAME n", and the ID of the OS is set as the "OS ID n".

In the example of FIG. 14, "Windows" is set as the "OS name 1", and "OSO1" is set as the "OS ID 1". In tiers under the "OPTION COUNT 1", the IPP-undefined printer device configuration information for Windows is described. Further, "Macintosh" is set as the "OS name 2", and "OS02" is set as the "OS ID 2". In tiers under the "OPTION COUNT 2", the IPP-undefined printer device configuration information for Macintosh is described. Further, "Linux" is set as the "OS name 3", and "OS03" is set as the "OS ID 3". In tiers under the "OPTION COUNT 3", the IPP-undefined printer device configuration information for Linux is described.

For example, in the case of the IPP-undefined printer device configuration information for Windows, "1" is set as the "OPTION COUNT 1" to indicate that one optional apparatus that accompanies the printer device 105 supports Windows. When the OS operating on the terminal apparatus 104 is Windows, the additional software 417 can search the information in this tier to grasp whether or not there is information supporting the OS operating on the terminal apparatus 104. In the case of Windows, the tiers under the "OPTION COUNT 1" is the same as the tiers under the "OPTION COUNT" illustrated in FIG. 11, and hence description thereof is omitted.

In the case of the IPP-undefined printer device configuration information for Macintosh, "0" is set as the "OPTION COUNT 2" to indicate that no optional apparatus that accompanies the printer device 105 supports Macintosh.

In the case of the IPP-undefined printer device configuration information for Linux, "1" is set as the "OPTION COUNT 3" to indicate that one optional apparatus that accompanies the printer device 105 supports Linux. Also in the case of Linux, the tiers under the "OPTION COUNT 3" is the same as the tiers under the "OPTION COUNT" illustrated in FIG. 11, and hence description thereof is omitted.

The option XML file handled in the second embodiment is formed of five layers (manufacturer name layer, OS name layer, option name layer, settable item name layer, and setting value name layer). However, as long as it is synchronized between the additional software 417 and the printer device 105 how the option XML file is structured, no particular limitations are imposed on the structure of the option XML file.

When selection items are selected in the respective setting items, the additional software 417 embeds the IDs and values corresponding to the items in pairs in the device-specific setting 1203. Thus, it is possible to inform through the print job what kind of items were selected during the processing for the extended print setting menu (with an XML file) in Step S912 of FIG. 13.

In the above-mentioned example of FIG. 14, the names of the different kinds of items are written in English, but the present disclosure is not limited to English, and character strings based on language information set in the printer device 105 in advance may be employed.

As described above, in the second embodiment as well, the same effects as those of the first embodiment described above are produced.

In each of the first and second embodiments described above, the configuration for storing, on the ROM/RAM 307 of the printer device 105, the information (option XML file) for defining and controlling its IPP-undefined printer device configuration information is described. However, the option XML file for the printer device 105 may be stored in the server 101, another server (not shown), or another such external system (may be stored in a storage area on the cloud). In the case of this configuration, the printer device 105 returns, for example, the URL for access to the option XML file, which is stored in such a server as described above, to the printer device 105 as the attribute value of "printer-more-info-manufacturer". Then, the terminal apparatus 104 uses, for example, the URL returned from the printer device 105 to acquire, from the server described above, the option XML file indicating the IPP-undefined printer device configuration information on the printer device 105. Thus, the print setting relating to the optional apparatus of the printer device 105 can be recognized on the terminal apparatus 104, and can be controlled by being displayed on the print setting screen of the printer driver 416. That is, a print job for controlling the vendor-specific optional apparatus can be generated on the terminal apparatus 104, and can be output to the printer device 105. With the above-mentioned configuration, the same effects as those of the first and second embodiments described above are produced.

Further, in each of the above-mentioned embodiments, the configuration in which the terminal apparatus 104 uses the IPP protocol to control the printer device 105 to perform printing is described, but a configuration using another protocol is also included in the present disclosure.

According to each of the above-mentioned embodiments, the information (IPP-undefined information) relating to the vendor-specific optional apparatus that cannot be supported singly by the general-purpose printer driver can be transmitted from the printer device to the terminal apparatus through use of the standard attribute defined by the IPP, and can be recognized on the terminal apparatus. Further, additional software provided by the printer device vendor, which is called from the general-purpose printer driver operating on the terminal apparatus, can be used to enable the print setting relating to the vendor-specific optional apparatus, and to obtain a printing result by controlling the printer device and the optional apparatus in a desired manner.

That is, even when printing is performed through use of the general-purpose printer driver that does not support the function of controlling the vendor-specific optional apparatus, it is possible to perform printing as desired by the user by making the most of the capabilities of the printer device and the optional apparatus.

The structures and details of the various kinds of data described above are not limited thereto, and it is to be understood that the various kinds of data are formed of various structures and details depending on the purpose and the object.

One embodiment has been described above, but the present disclosure may be embodied as a system, an apparatus, a method, a program, or a storage medium, for example. Specifically, the present disclosure may be applied to a system formed of a plurality of devices, or to an apparatus formed of one device.

All configurations obtained by combining the above-mentioned embodiments are also encompassed in the present disclosure.

Other Embodiments

The present disclosure may also be realized by processing of supplying a program for implementing one or more functions of the above-mentioned embodiments to a system or apparatus via a network or a storage medium, and reading and executing the program by one or more processors of a computer of the system or apparatus. Moreover, the present disclosure may also be realized by a circuit (for example, ASIC) for implementing one or more functions.

Moreover, the present disclosure may be applied to a system formed of a plurality of devices, or to an apparatus formed of one device.

The present disclosure is not limited to the above-mentioned embodiments. Various modifications (including an organic combination of the embodiments) may be made thereto based on the spirit of the present disclosure, and such modifications are not to be excluded from the scope of the present disclosure. In other words, all configurations obtained by combining the above-mentioned embodiments and modification examples thereof are also encompassed in the present disclosure.

According to the present disclosure, an information processing apparatus configured to perform printing through use of the general-purpose printer driver can be correctly informed of the configuration of the printer device including the vendor-specific optional apparatus, to thereby enable full use of the capabilities of the printer device.

Various embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-123647, filed Jul. 2, 2019, which is hereby incorporated by reference herein in its entirety.

What is claimed is:

1. A printer device comprising a controller including a processor, the controller configured to:
   transmit, according to an Internet Printing Protocol, (a) first information identifying a first print setting item and (b) a first print setting value of the first print setting item to an information processing apparatus;
   transmit, according to the Internet Printing Protocol, an address of a file that stores (c) second information identifying a second print setting item and (d) a second print setting value of the second print setting item to the information processing apparatus, wherein the second information and the second print setting value are not transmitted to the information processing apparatus according to the Internet Printing Protocol;
   receive print data including print setting values set via a print setting screen displayed by the information processing apparatus based on the second information and the second print setting value that are stored in the file; and
   perform a process based on the received print data.

2. The printer device according to claim 1, wherein the second print setting item and the second print setting value are not defined by the Internet Printing Protocol.

3. The printer device according to claim 1, wherein the address of the file is a URL for accessing the file.

4. The printer device according to claim 1, wherein the controller is configured to:
   receive, according to the Internet Printing Protocol, a first inquiry including predetermined attribute information, wherein the address is transmitted as a response to the received first inquiry.

5. The printer device according to claim 1, wherein the controller is configured to:
   generate the file based on hardware configuration of the printer device.

6. The printer device according to claim 1,
   wherein the file stores the second information for each operating system, and
   wherein the controller is configured to:
   acquire information on an operating system operating on the information processing apparatus from the information processing apparatus; and
   transmit the second information corresponding to the operating system to the information processing apparatus.

7. The printer device according to claim 1, further comprising:
   a storage unit configured to store the file,
   wherein the controller is configured to transmit the second information and the second print setting value to the information processing apparatus when the information processing apparatus accesses the transmitted address.

8. The printer device according to claim 1, wherein the file is stored in an external system.

9. The printer device according to claim 4, wherein the controller is configured to receive, according to the Internet Printing Protocol, a second inquiry including another predetermined attribute information, wherein the first information and the first print setting value are transmitted as a response to the received second inquiry.

10. The printer device according to claim 1, wherein the controller is configured to receive the print data from the information processing apparatus.

11. A control method for a printer device comprising a controller including a processor, the control method comprising:
   transmitting, according to an Internet Printing Protocol, (a) first information identifying a first print setting item and (b) a first print setting value of the first print setting item to an information processing apparatus;
   transmit, according to the Internet Printing Protocol, an address of a file that stores (c) second information identifying a second print setting item and (d) a second print setting value of the second print setting item to the information processing apparatus, wherein the second information and the second print setting value are not transmitted to the information processing apparatus according to the Internet Printing Protocol;
   receive print data including print setting values set via a print setting screen displayed by the information processing apparatus based on the second information and the second print setting value that are stored in the file; and
   perform a process based on the received print data.

12. An information processing apparatus comprising a controller including a processor, the controller configured to:
   receive, according to an Internet Printing Protocol, (a) first information identifying a first print setting item and (b) a first print setting value of the first print setting item transmitted by a printer device;
   receive, according to the Internet Printing Protocol, an address of a file that stores (c) second information identifying a second print setting item and (d) a second print setting value of the second print setting item, wherein the second information and the second print setting value are not transmitted according to the Internet Printing Protocol;
   obtain the second information and the second print setting value that are stored in the file by accessing the received address;
   display a print setting screen based on the obtained second information and the second print setting value;
   generate print data including print setting values set via the displayed print setting screen; and
   transmit the generated print data.

13. The information processing apparatus according to claim 12,
   wherein the second information and the second print setting value are not defined by the Internet Printing Protocol.

14. The information processing apparatus according to claim 12,
   wherein the controller is configured to transmit a first inquiry including predetermined attribute information and receive the address of the file as a response to the first inquiry.

15. The information processing apparatus according to claim 12, wherein the controller is configured to display another print setting screen based on the received first information and the first print setting value, wherein the second information and the second print setting value are obtained based on a predetermined user instruction received via the displayed second print setting screen.

16. The information processing apparatus according to claim 12, wherein the file is stored in the printer device.

17. A control method for an information processing apparatus comprising a controller including a processor, the control method comprising:
- receiving, according to an Internet Printing Protocol, (a) first information identifying a first print setting item and (b) a first print setting value of the first print setting item transmitted by a printer device;
- receiving, according to the Internet Printing Protocol, an address of a file that stores (c) second information identifying a second print setting item and (d) a second print setting value of the second print setting item, wherein the second information and the second print setting value are not transmitted according to the Internet Printing Protocol;
- obtaining the second information and the second print setting value that are stored in the file by accessing the received address;
- displaying a print setting screen based on the obtained second information and the second print setting value;
- generating print data including print setting values set via the displayed print setting screen; and
- transmitting the generated print data.

* * * * *